(12) United States Patent
Kojima et al.

(10) Patent No.: US 7,962,441 B2
(45) Date of Patent: Jun. 14, 2011

(54) AIR CONDITIONER FOR VEHICLE AND CONTROLLING METHOD THEREOF

(75) Inventors: Yasufumi Kojima, Gifu (JP); Hiroshi Takeda, Nagoya (JP); Hiroyuki Tomita, Nagoya (JP)

(73) Assignee: Denso Corporation, Kariya (JP)

( * ) Notice: Subject to any disclaimer, the term of this patent is extended or adjusted under 35 U.S.C. 154(b) by 824 days.

(21) Appl. No.: 11/901,946

(22) Filed: Sep. 19, 2007

(65) Prior Publication Data

US 2008/0073057 A1 Mar. 27, 2008

(30) Foreign Application Priority Data

Sep. 22, 2006 (JP) ................................. 2006-257448
Sep. 26, 2006 (JP) ................................. 2006-260699
Apr. 4, 2007 (JP) ................................. 2007-098522

(51) Int. Cl.
*G06F 15/00* (2006.01)
*G06F 15/18* (2006.01)

(52) U.S. Cl. ........................................................ 706/62
(58) Field of Classification Search ...................... 706/62
See application file for complete search history.

(56) References Cited

U.S. PATENT DOCUMENTS

| | | | | |
|---|---|---|---|---|
| 4,434,932 | A | * | 3/1984 | Hara et al. ................... 236/49.3 |
| 5,555,495 | A | * | 9/1996 | Bell et al. ......................... 700/38 |
| 6,064,958 | A | * | 5/2000 | Takahashi et al. ............ 704/243 |
| 6,435,417 | B1 | * | 8/2002 | Holdgrewe et al. ......... 236/46 R |
| 6,498,958 | B1 | | 12/2002 | Tateishi et al. |
| 2003/0127527 | A1 | * | 7/2003 | Ichishi et al. ................. 236/49.3 |
| 2003/0136854 | A1 | * | 7/2003 | Aoki et al. ................... 236/49.3 |
| 2004/0102151 | A1 | | 5/2004 | Shikata et al. |
| 2006/0149544 | A1 | * | 7/2006 | Hakkani-Tur et al. ........ 704/236 |
| 2006/0195483 | A1 | | 8/2006 | Heider et al. |
| 2007/0011195 | A1 | | 1/2007 | Kutsumi et al. |
| 2007/0288413 | A1 | | 12/2007 | Mizuno et al. |

FOREIGN PATENT DOCUMENTS

| | | |
|---|---|---|
| CN | 1389675 | 1/2003 |
| CN | 1504354 | 6/2004 |
| CN | 1696847 | 11/2005 |
| DE | 44 26 732 | 2/1995 |
| DE | 698 12 525 | 4/1999 |

(Continued)

OTHER PUBLICATIONS

Michael C. Mozer, The Neural Network House: An Environment that Adapts to its Inhabitants, Proceedings of the American Association for Artificial Intelligence Spring Symposium on Intelligent Environments, pp. 110-114, 1998.*

(Continued)

*Primary Examiner* — Donald Sparks
*Assistant Examiner* — Vincent M Gonzales
(74) *Attorney, Agent, or Firm* — Harness, Dickey & Pierce, PLC

(57) ABSTRACT

An air conditioner for a vehicle includes an air-conditioning unit for supplying conditioned air into a vehicle, an information acquiring unit for acquiring state information indicating a state of the vehicle, a control information modifying unit having at least one probabilistic model for calculating the probability that a passenger will perform a predetermined setting operation, calculating the probability by inputting the state information into the at least one probabilistic model, and modifying the setting information or the control information related to the predetermined setting operation according to the probability so that the predetermined setting operation is performed, and an air-conditioning control unit for controlling the air-conditioning unit according to the modified setting information or modified control information.

32 Claims, 14 Drawing Sheets

FOREIGN PATENT DOCUMENTS

| | | |
|---|---|---|
| DE | 698 11 814 | 8/1999 |
| DE | 100 03 548 | 8/2000 |
| DE | 199 04 143 | 8/2000 |
| DE | 102 02 928 | 7/2003 |
| DE | 103 33 181 | 5/2005 |
| DE | 103 50 715 | 6/2005 |
| JP | 2-178552 | 7/1990 |
| JP | 3-008003 | 1/1991 |
| JP | 3-242702 | 10/1991 |
| JP | 7-020908 | 1/1995 |
| JP | 8-197933 | 8/1996 |
| JP | 08-271026 | 10/1996 |
| JP | 9-269145 | 10/1997 |
| JP | 11-099847 | 4/1999 |
| JP | 2000-062431 | 2/2000 |
| JP | 2000-293204 | 10/2000 |
| JP | 2002-507793 | 3/2002 |
| JP | 2003-220816 | 8/2003 |
| JP | 2005-067353 | 3/2005 |
| JP | 2005-202786 | 7/2005 |
| JP | 2005-228355 | 8/2005 |
| JP | 2005-257270 | 9/2005 |
| JP | 2006-055902 | 3/2006 |
| JP | 2006-240387 | 9/2006 |
| JP | 2006-308182 | 11/2006 |
| WO | WO2005/047062 | 5/2005 |
| WO | WO 2005/091214 | 9/2005 |

OTHER PUBLICATIONS

K. Tajiri, et al., "Variation of the Energy Consumption for Air Conditioning with the Occupants Cross Ventilation Usage", Technical papers of Annual Meeting of SHASE (Aug. 9-11, 2005. SAPPRO), pp. 1713-1716.

Richard O. Duda, et al., "Pattern Classification", Second Edition, John Wiley & Sons, Inc.

Office action dated Sep. 25, 2009 in related Chinese Application No. 2008 10131658.0.

Office action dated Dec. 2, 2008 in Japanese Application No. 2007/032251.

K. Shigemasu et al ; "Overview of Bayesian Networks", Baifukan, pp. 34-39 and 84-87.

Office Action dated Oct. 29, 2010, for corresponding German Application No. 10 2008 007 725.9, and English translation thereof.

Office action dated Sep. 21, 2010 in related German Application No. 070452316 and English translation.

Adams, Douglas,"Per Anhalter durch die Galaxis", novel, 14$^{th}$ edn., reprint of UB31070, Frankfurt am Main; Berlin, Ullstein, 1990, chapter 10, pp. 83-84. ISBN 3-548-22491-1 (English translation of the relevant part).

Office Action dated Mar. 29, 2011 in corresponding Japanese Application No. 2006-260699.

* cited by examiner

Fig.5A

| DAY OF THE WEEK: $x_1$ | | $P(x_1)$ |
|---|---|---|
| | SATURDAY ($x_1=1$) | 0.143 |
| | THE OTHER DAY ($x_1=0$) | 0.857 |

| TIME: $x_2$ | | $P(x_2)$ |
|---|---|---|
| | DAYTIME ($x_2=1$) | 0.5 |
| | NIGHT ($x_2=0$) | 0.5 |

| PRESENT LOCATION: $x_3$ | | $P(x_3)$ |
|---|---|---|
| | PARK ($x_3=1$) | 0.15 |
| | THE OTHER PLACE ($x_3=0$) | 0.85 |

| $(x_1,x_2,x_3)$ | $P(x_4|x_1,x_2,x_3)$ |
|---|---|
| (0,0,0) | 0.1 |
| (1,0,0) | 0.2 |
| (0,1,0) | 0.4 |
| (0,0,1) | 0.3 |
| (1,1,0) | 0.55 |
| (1,0,1) | 0.15 |
| (0,1,1) | 0.7 |
| (1,1,1) | 0.95 |

109

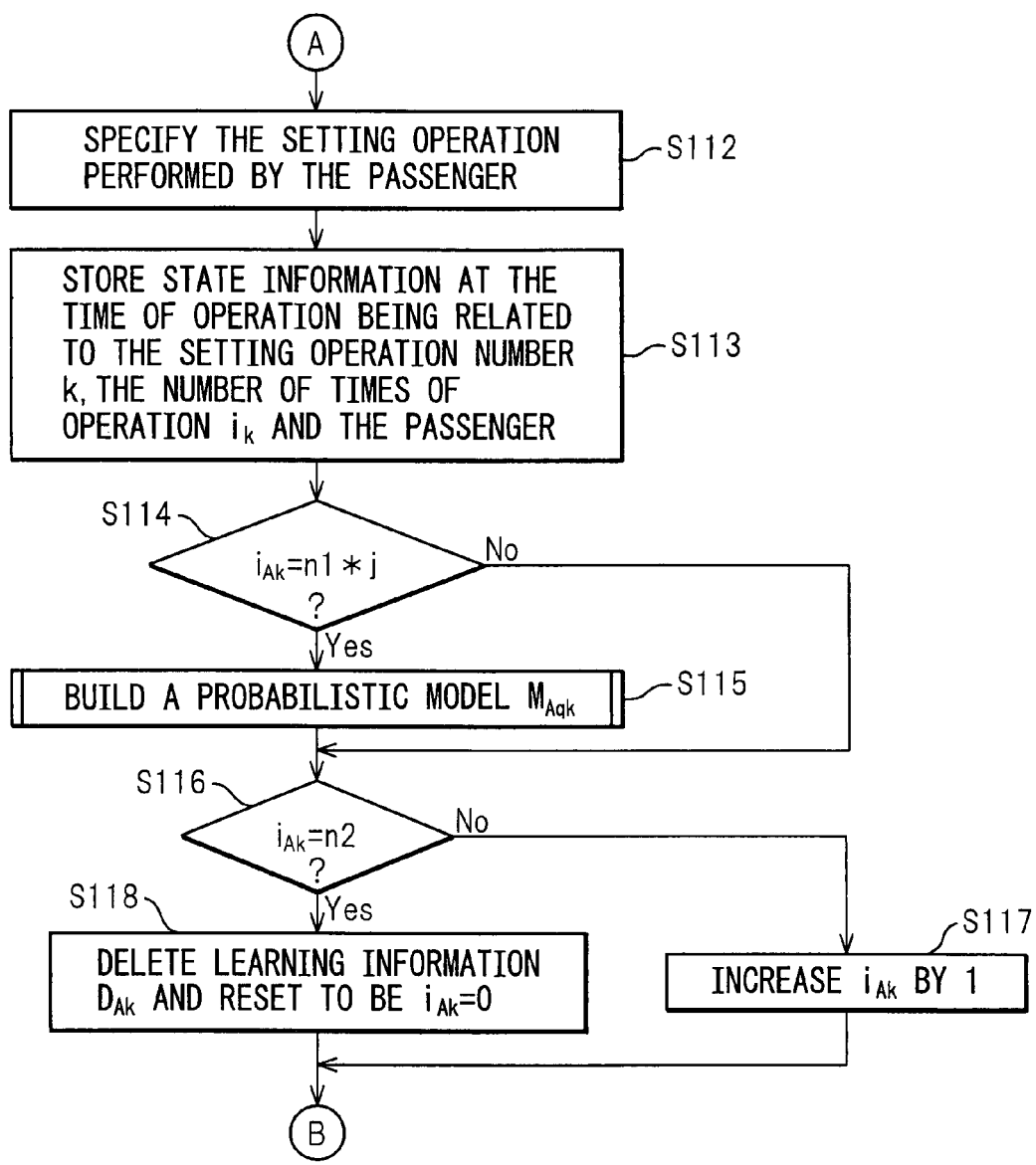

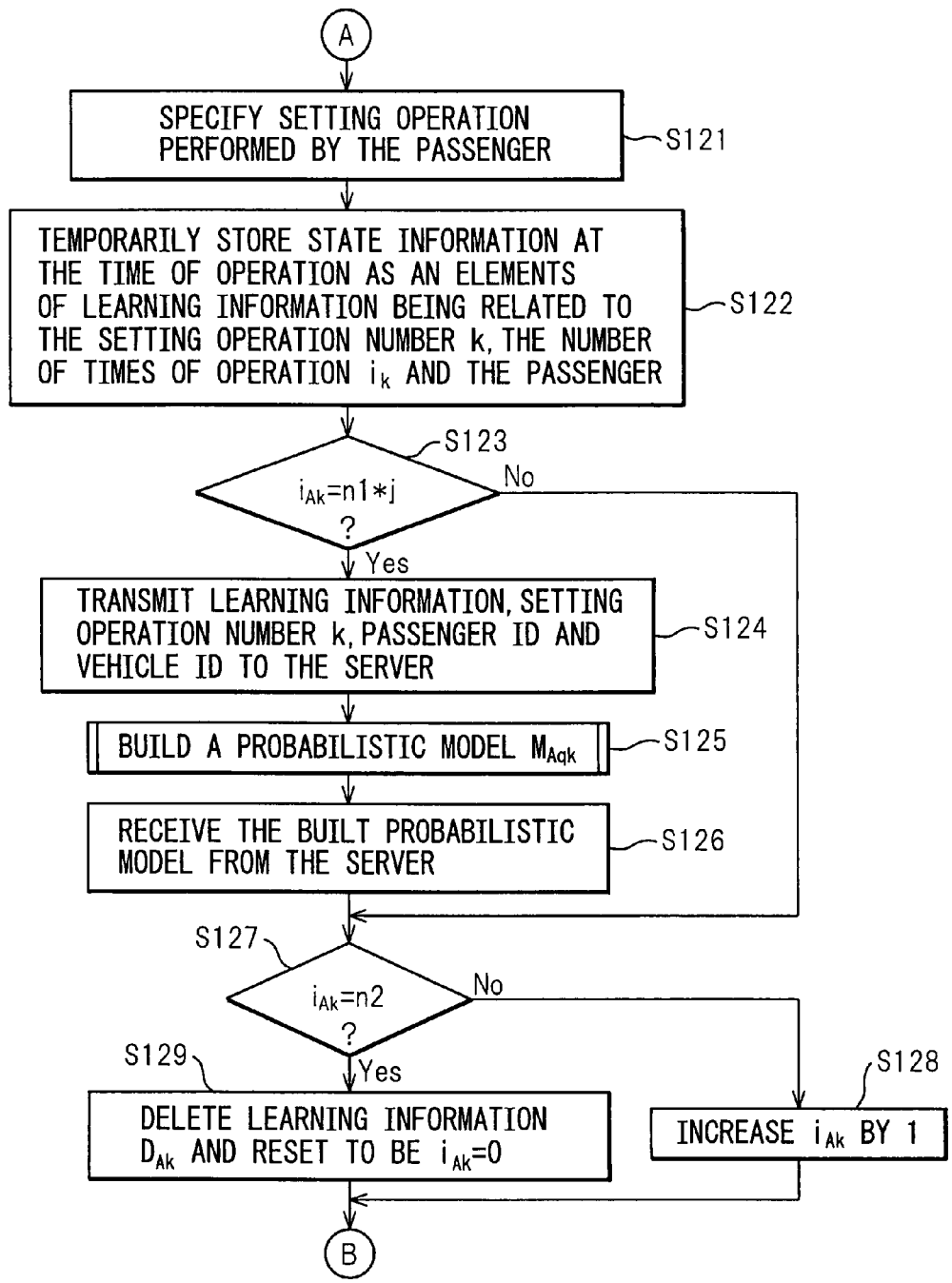

AIR CONDITIONER FOR VEHICLE AND CONTROLLING METHOD THEREOF

The applicant claims the right to priority based on Japanese Patent Application JP 2006-257448, filed on Sep. 22, 2006, Japanese Patent Application JP 2006-260699, filed on Sep. 26, 2006, and Japanese Patent Application JP 2007-098522, filed on Apr. 4, 2007. The entire content of JP 2006-257448, JP 2006-260699 and JP 2007-098522 are hereby incorporated by reference.

FIELD OF THE INVENTION

The present invention relates to an air conditioner for a vehicle and a controlling method thereof. More particularly, the present invention relates to an air conditioner for a vehicle capable of automatically optimizing a state of air-conditioning according to a passenger's sensitivity to temperature. The present invention also relates to a method of controlling the air conditioner.

BACKGROUND OF THE INVENTION

Generally, an air conditioner for a vehicle automatically decides a temperature and air volume of conditioned air sent out from each blowout port according to various parameters such as a temperature setting, outside air temperature, inside air temperature and sunshine. However, one person's sensitivity to temperature may differ from that of other person, as some passengers are sensitive to heat and others are sensitive to cold. Therefore, even when the air conditioner automatically decides a temperature of conditioned air, air volume of conditioned air and so forth, the temperature and the air volume are not necessarily optimum for passengers in some cases. In such a case, if necessary, the passenger adjusts the air conditioner so that the temperature setting is raised or lowered, or the air volume is increased or decreased. In this connection, Japanese unexamined patent publication NO. 2000-293204 discloses an air conditioner controller with learning control, which modifies a relational equation for deciding the temperature and the volume of conditioned air using various parameters when a temperature setting and an air volume setting are changed by a passenger via an operation panel.

In addition, one passenger may change the setting of an air conditioner independent of the temperature sensitivity of other passengers. A passenger may change the setting due to an external environmental factor. For example, when doing exercises right before driving a vehicle, the temperature setting may be decreased lower than a usual setting. Or, when the vehicle is stuck in a traffic jam, in order to prevent the passenger room from being filled with exhaust gas, a recirculation mode may be set. However, in the air conditioner controller described in Japanese unexamined patent publication NO. 2000-293204, it is impossible to discriminate between a case in which the setting of the air conditioner is changed due to an external environmental factors and a case in which the setting is changed simply to provide a more comfortable temperature.

On the other hand, Japanese unexamined patent publication No. 2000-62431 discloses an air conditioner for an automobile which can perform either the air conditioning learning or the other learning separately by adding data indicating a location of the vehicle itself during driving, to the learning data. The air conditioner decides whether or not the air conditioning learning is performed, referring to the location of the vehicle and the date and hour. However, Japanese unexamined patent publication No. 2000-62431 does not disclose a concrete method of deciding whether or not air conditioning learning is performed. Further, optimizing the air conditioning temperature in accordance with the specific circumstances is not disclosed.

Therefore, it is desirable to develop an air conditioner for automatically optimizing an air conditioning temperature and so forth in accordance with specific circumstances.

SUMMARY OF THE INVENTION

An object of the present invention is to provide an air conditioner for a vehicle and a controlling method thereof capable of automatically optimizing the setting of air-conditioning in accordance with specific circumstances.

Another object of the present invention is to provide an air conditioner for a vehicle and a controlling method thereof capable of automatically learning the optimum air-conditioning setting for the specific circumstances.

Still another object of the present invention is to provide an air conditioner for a vehicle and a controlling method thereof capable of automatically learning the air-conditioning setting in accordance with a passenger's sensitivity to temperature and being not affected by the specific circumstances.

Still another object of the present invention is to provide an air conditioner for a vehicle and a controlling method thereof capable of learning the optimum air-conditioning setting for a passenger sensitive to temperature or specific circumstances using a limited resource.

According to one aspect of the present invention, an air conditioner for a vehicle is provided. The air conditioner includes an air-conditioning unit for supplying conditioned air into a vehicle, an information acquiring unit for acquiring state information indicating a state of the vehicle, a control information modifying unit having at least one probabilistic model for calculating a probability that a passenger will perform a predetermined setting operation, for calculating the probability by inputting the state information into at least one probabilistic model, and modifying the setting information or the control information related to the setting operation of the passenger according to the probability so that the predetermined setting operation is performed, and an air-conditioning control unit for controlling the air-conditioning unit according to the modified setting information or control information.

Since the air conditioner is composed as described above, the air conditioner can automatically optimize the air-conditioning setting in a passenger room according to a specific circumstance. In this connection, the state information represents a state of the vehicle. In other words, the state information includes at least one of the air-conditioning information (the outside air temperature, the inside air temperature and sunshine) of the vehicle, the locational information of the vehicle, the motion information of the vehicle, the time and the biological information of a passenger. The predetermined setting operation indicates an operation for changing the status of the air conditioner. In particular, the predetermined setting operation includes changing the setting temperature, changing the air volume, setting recirculation mode and starting/stopping the defroster. Further, the setting information indicates information for prescribing an operation of the air conditioner. In particular, the setting information includes a setting temperature, an air volume, a ratio of inside air to outside air and a ratio of air volume of conditioned air blown out from each blowout port. Furthermore, the control information indicates information which is determined based on the setting information and used to control each unit of the air-conditioning unit. In particular, the control information includes a temperature of the conditioned air, a rotating speed of the blower and an degree of opening of the air mixing door.

It is preferable that the control information modifying unit modifies the setting information or the control information when the probability is not less than a first threshold value.

Further, it is preferable that an air conditioner according to the present invention further includes a confirmation operating unit for informing a passenger of a content of the predetermined setting operation and confirming whether or not the predetermined setting operation is performed when the probability is lower than the first threshold value and not less than a second threshold value which is lower than the first threshold value, wherein the control information modifying unit modifies the setting information or the control information when it is confirmed via the confirmation operating unit that the predetermined setting operation is performed.

Since the air conditioner is composed as described above, when a passenger executes a predetermined setting operation, the air conditioner automatically may execute the setting operation. When the passenger may execute the setting operation, the air conditioner executes its setting operation by performing an operation for confirming the setting operation. Therefore, it is possible to optimize the air-conditioning setting by a simple operation.

It is preferable that the control information modifying unit has a plurality of probabilistic models related to the predetermined control information, calculates the probabilities of performing the predetermined setting operation based on the plurality of probabilistic models and determines the highest probability of the probabilities as the probability.

Since the air conditioner is composed as described above, the air conditioner can provide probabilistic models corresponding to different circumstances. Therefore, depending on the circumstances, the air conditioner can automatically optimize the air-conditioning setting. In addition, since the air conditioner modifies the setting information or control information based on the highest probability of the probabilities which were respectively determined for a plurality of probabilistic models, it is possible to prevent setting operations which are incompatible with each other.

It is preferable that an air conditioner according to the present invention further includes a passenger information acquiring unit for acquiring passenger information and a identifying unit for matching the passenger with at least one registered user that was previously stored using the passenger information, wherein the control information modifying unit calculates the probability based on a probabilistic model related to the registered user that was identified as the passenger by the identifying unit.

Since the air conditioner is composed as described above, the air conditioner can use a different probabilistic model for each passenger. Accordingly, the air conditioner can optimize the air-conditioning setting according to a passenger.

It is preferable that an air conditioner for a vehicle further includes an operating unit for performing a setting operation of the air conditioner, a storage unit for storing the state information acquired by the information acquiring unit and relating the state information to the predetermined setting operation, each time when the predetermined setting operation is performed via the operating unit, and a learning unit for building a first probabilistic model for calculating the probability of performing the predetermined setting operation using the state information which is stored in the storage unit and related to the predetermined setting operation.

Since the air conditioner is composed as described above, as a passenger executes the setting operation, a new probabilistic model is built. Accordingly, as the use of the air conditioner is continued, the air conditioner can automatically execute the setting operation corresponding to various circumstances.

It is preferable that the learning unit builds temporary probabilistic models by deciding a graph structure of each temporary probability model and a conditional probability relating to each node included in the graph structure using the state information which is stored in the storage unit and related to the predetermined setting operation, and selects the most appropriate temporary probabilistic model from the temporary probabilistic models according to a predetermined criterion as the first probabilistic model.

It is preferable that the learning unit has a plurality of standard models having a predetermined graph structure, and the learning unit builds temporary probabilistic models by deciding a conditional probability relating to each node included in the predetermined graph structure using the state information which is stored in the storage unit and related to the predetermined setting operation, and selects the most appropriate temporary probabilistic model from the temporary probabilistic models according to a predetermined criterion as the first probabilistic model.

It is preferable that the predetermined criterion is an information criterion and the learning unit decides a temporary probabilistic model corresponding to the maximum value or the minimum value of the calculated information criterion with respect to each of the temporary probabilistic models as the first probabilistic model.

Since the air conditioner is composed as described above, when the probabilistic model is built, it is possible to restrict a range for searching a graph structure of the probabilistic model. Accordingly, the air conditioner can build the probabilistic model using a limited hardware resource and a short period of time of calculation. Further, since the air conditioner evaluates the probabilistic model using the information criterion, the air conditioner can prevent over-training of the probabilistic model and select a probabilistic model into which only information really contributing to a calculation of the probability is inputted.

It is preferable that the learning unit builds the first probabilistic model when the number of times of performing the predetermined setting operation is not less than the first predetermined number.

In this case, the learning unit deletes the state information, which is stored and related to the predetermined setting operation, from the storage unit and initializes the number of times, when the number of times of performing the predetermined setting operation is the second predetermined number, and builds a second probabilistic model for calculating the probability of performing the predetermined setting operation using the state information which is acquired each time when the predetermined setting operation is performed, stored in the storage unit and related to the predetermined setting operation, when the number of times of performing the predetermined setting operation reaches the first predetermined number after the number of times reached by the second predetermined number.

Since the air conditioner is composed as described above, the air conditioner discards information used for building the probabilistic model. Then, the air conditioner builds another probabilistic model using information accumulated after that. Accordingly, the air conditioner can adapt to a passenger having a plurality of habits with respect to the same setting operation and the air conditioner can build a probabilistic model corresponding to each circumstance.

It is preferable that the air conditioner according to the present invention further includes a passenger information acquiring unit for acquiring passenger information and a identifying unit for matching the passenger with at least one registered user that was previously stored using the passenger information, wherein the storage unit relates the state information to the registered user which was identified as the passenger by the identifying unit and stores the state information; and wherein the learning unit counts separately the number of times for each registered user, and when the number of times counted with respect to anyone of the registered users is not less than the first predetermined number, builds the first probabilistic model using the state information related to the registered user.

Since the air conditioner is composed as described above, it is possible to build a different probabilistic model for each passenger. Accordingly, the air conditioner can build a probabilistic model for executing the air-conditioning setting corresponding to each passenger's sensitivity to temperature and a specific circumstance peculiar to each passenger.

It is preferable that the air conditioner according to the present invention further includes a server arranged outside the vehicle, an operating unit for performing a setting operation of the air conditioner, and a first communicating unit mounted on the vehicle, for performing a wireless communication with the server to transmit the state information which is acquired by the information acquiring unit when the predetermined setting operation is performed, together with the setting operation information indicating the predetermined setting operation to the server each time when a predetermined period of time passes, each time when the predetermined setting operation is performed via the operating unit, or each time when number of times of performing the predetermined setting operation is not less than a predetermined number.

Further, the server includes a storage unit for storing the state information acquired by the information acquiring unit when the predetermined setting operation is performed and relating the state information to the predetermined setting operation, based on the setting operation information, a learning unit for building a first probabilistic model for calculating the probability of performing the predetermined setting operation using the state information which is stored in the storage unit and related to the predetermined setting operation and a second communicating unit for performing a wireless communication with the vehicle to transmit the first probabilistic model to the vehicle so that the control information modifying unit use the first probabilistic model.

Since the air conditioner is composed as described above, learning process for building a probabilistic model, for which a large amount of calculation is required, can be executed by a server arranged outside the vehicle. Accordingly, the probabilistic model can be built without giving a heavy calculation load to a processor mounted on the vehicle.

It is preferable that the air conditioner according to the present application further includes a passenger information acquiring unit for acquiring passenger information and a identifying unit for matching the passenger with at least one registered user that was previously stored using the passenger information. In this connection, it is preferable that the first communicating unit transmits identification information of the registered user which was identified as the passenger by the identifying unit to the server together with the state information and the setting operation information, the storage unit relates the state information to the registered user based on the identification information and stores the state information, and the learning unit counts separately the number of times for each registered user, and when the number of times counted with respect to anyone of the registered users is not less than the first predetermined number, builds the first probabilistic model using the state information related to the registered user.

According to another aspect of the present invention, there is provided a method for controlling an air conditioner for a vehicle having an air-conditioning unit for supplying conditioned air into the vehicle. This method includes acquiring state information indicating a state of the vehicle, calculating a probability that a passenger will perform a predetermined setting operation, by inputting the state information into at least one probabilistic model for calculating the probability, modifying setting information or control information related to the setting operation of the passenger according to the probability so that the predetermined setting operation is performed, when the probability satisfies a predetermined condition, and controlling the air-conditioning unit according to the modified setting information or control information.

It is preferable that the air conditioner further includes an operating unit for performing setting operation of the air conditioner and a storage unit, and the method further includes storing the state information into the storage unit and relating the sate information to the predetermined setting operation, each time when the predetermined setting operation is performed via the operating unit, and building a first probabilistic model for calculating the probability of performing the predetermined setting operation using the state information which is stored in the storage unit and related to the predetermined setting operation.

It is preferable that the method for controlling an air conditioner further includes comparing the number of times of performing the predetermined setting operation with the first predetermined number, wherein building the first probabilistic model when the number of times is not less than the first predetermined number.

In this case, it is preferable that the method for controlling an air conditioner further includes comparing the number of times with the second predetermined number, deleting the state information, which is stored and related to the predetermined setting operation, from the storage unit and initializing the number of times when the number of times of performing the predetermined setting operation is the second predetermined number, and building a second probabilistic model for calculating the probability of performing the predetermined setting operation using the state information which is stored in the storage unit and related to the predetermined setting operation each time when the predetermined setting operation is performed, when the number of times of performing the predetermined setting operation reaches the first predetermined number after the number of times reached the second predetermined number.

According to still another aspect of the present invention, an air conditioner for a vehicle is provided. The air conditioner includes an air-conditioning unit for supplying conditioned air into the vehicle, an information acquiring unit for acquiring state information indicating a state of the vehicle, wherein the state information includes at least one of the pieces of locational information of the vehicle, motion information of the vehicle, time information and biological information of a passenger and also includes the air-conditioning information of the vehicle, an operating unit for acquiring the setting information related to the setting operation of a passenger, an air-conditioning control unit having a control equation for calculating the control information based on the air-conditioning information and the setting information, and controlling the air-conditioning unit according to the control information calculated using the control equation, a storage unit for storing the state information acquired by the information acquiring unit each time when the predetermined setting operation is performed via the operating unit, and a learning unit for selecting the state information related to the predetermined setting operation based on the state information stored in the storage unit when the number of times of performing the setting operation is not less than the predetermined number, and modifying the control equation when the selected state information only include the air-conditioning information.

Since the air conditioner is composed as described above, the air conditioner can learn an air-conditioning setting in accordance with a passenger's sensitivity to temperature without being affected by specific circumstances. In this case, the control equation may use not only a function but also a reference table or map on which output values are defined with respect to input values.

It is preferable that the air conditioner further includes a control information modifying unit having at least one probabilistic model for calculating a probability that the passenger will perform the predetermined setting operation, and calculating the probability by inputting the state information into the at least one probabilistic model, and modifying the setting information or the control information according to the probability so that the predetermined setting operation is performed. In this case, it is preferable that the learning unit builds the probabilistic model related to the predetermined setting operation when the selected state information includes information which is independent of the air-conditioning information.

Since the air conditioner is composed as described above, the air conditioner can perform the air-conditioning setting in accordance with a passenger's sensitivity to temperature and optimize the air-conditioning setting corresponding to specific circumstances.

It is preferable that the learning unit builds temporary probabilistic models for calculating the probability by deciding a graph structure of each temporary probability model and a conditional probability relating to each node included in the graph structure using the state information which is stored in the storage unit and related to the predetermined setting operation, selects the most appropriate temporary probabilistic model from the temporary probabilistic models according to a predetermined criterion, and selects the state information which is to be inputted into the selected temporary probabilistic model as the state information related to the predetermined setting operation.

Alternatively, it is preferable that the learning unit has a plurality of standard models having a predetermined graph structure, and the learning unit builds temporary probabilistic models by deciding a conditional probability relating to each node included in the predetermined graph structure using the state information which is stored in the storage unit and related to the predetermined setting operation when the number of times of performing the predetermined setting operation is not less than the predetermined number, and the learning unit selects the most appropriate temporary probabilistic model from the temporary probabilistic models according to a predetermined criterion, and selects the state information which is to be inputted into the selected temporary probabilistic model as the state information related to the predetermined setting operation.

Since the air conditioner is composed as described above, the air conditioner can appropriately select a piece of state information related to the predetermined setting operation of a large number of pieces of state information. In other words, the air conditioner can appropriately select a piece of state information, which is a factor for judging whether or not the predetermined setting operation is performed.

Further, it is preferable that the predetermined criterion is an information criterion and the learning unit selects a temporary probabilistic model corresponding to the maximum value or the minimum value of the information criterion calculated with respect to each of the temporary probabilistic models.

Since the air conditioner determines the probabilistic model for calculating the probability that a passenger performs the predetermined setting operation, and determines the input information to be inputted into the probabilistic model, the air conditioner can select information actually related to the predetermined setting operation.

Further, it is preferable that the learning unit sets the selected temporary probabilistic model to the probabilistic model related to the predetermined setting operation when the selected state information includes information which is independent of the air-conditioning information.

According to still another aspect of the present invention, a method of controlling an air conditioner for a vehicle is provided, the air conditioner including an air-conditioning unit for supplying conditioned air into a vehicle, an information acquiring unit for acquiring state information indicating a state of the vehicle, the state information including at least one of the pieces of locational information of the vehicle, motion information of the vehicle, time information and biological information of a passenger and also includes the air-conditioning information of the vehicle, an operating unit for acquiring the setting information related to the setting operation of a passenger, and an air-conditioning control unit having a control equation for calculating the control information based on the air-conditioning information and the setting information, and controlling the air-conditioning unit according to the control information calculated using the control equation.

The method includes storing the state information acquired by the information acquiring unit each time the predetermined setting operation is performed via the operating unit, selecting the state information related to the predetermined setting operation based on the state information stored in the storage unit when the number of times of performing the setting operation is not less than a predetermined number, judging whether or not the selected state information only includes the air-conditioning information, and modifying the control equation when the selected state information only includes the air-conditioning information.

It is preferable that the air conditioner further includes a control information modifying unit having at least one probabilistic model for calculating a probability that the passenger will perform the predetermined setting operation, and calculating the probability by inputting the state information into the at least one probabilistic model, and modifying the setting information or the control information according to the probability so that the predetermined setting operation is performed, and the method further includes building the probabilistic model related to the predetermined setting operation when the selected state information includes information which is independent of the air-conditioning information.

According to still another aspect of the present invention, a controller for controlling a device is provided. The controller includes an information acquiring unit for acquiring state information including the first and the second information, an operating unit for acquiring the setting information corresponding to the setting operation of the device, a control unit for calculating control information by inputting the first information and the setting information into a predetermined control equation and for controlling the device according to the control information, a storage unit for storing the state information acquired by the information acquiring unit each time the predetermined setting operation is performed via the operating unit, and a learning unit for selecting the state information related to the predetermined setting operation based on the state information stored in the storage unit and modifying the predetermined control equation when the selected state information only include the first information.

BRIEF DESCRIPTION OF THE DRAWINGS

These and other features and advantages of the present invention will be better understood by reading the following detailed description, taken together with the drawings wherein:

FIGS. 5A to 5D show a conditional probability table with respect to each node of the probabilistic model shown in FIG. 4;

FIG. 9 shows a flow chart for controlling of the air conditioner according to the first embodiment of the present invention;

FIG. 14 shows a flow chart for controlling of the air conditioner according to third embodiment of the present invention.

DETAILED DESCRIPTION OF THE PREFERRED EMBODIMENT

Figure 1:
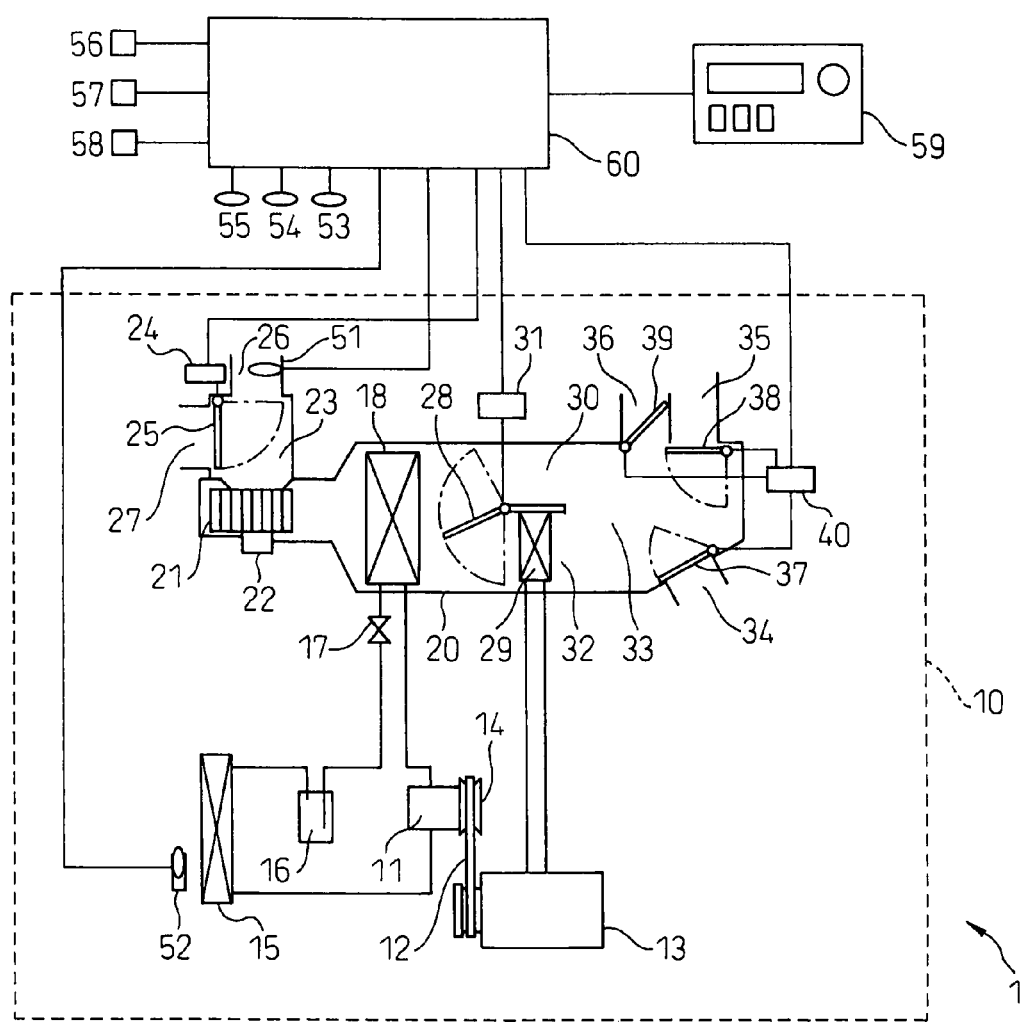
FIG. 1 is an overall arrangement view showing an air conditioner for a vehicle according to the first embodiment of the present invention.

Referring to the drawings, an air conditioner for a vehicle according to the present invention will be explained below. However, it should be noted that the present invention is not limited by the following explanation, and the present invention includes matters described in the claim of the present invention.

An air conditioner for a vehicle according to the first embodiment of the present invention will be explained below.

The air conditioner according to the first embodiment of the present invention estimates an air-conditioning setting operation performed by a passenger and automatically executes the air-conditioning setting based on at least one probabilistic model which has been learned in accordance with a passenger's sensitivity to temperature or specific circumstances. As the learning of the probabilistic model is advanced, the air conditioner generates a further probabilistic model different from the previously generated probabilistic model. Due to the foregoing, probabilistic models corresponding to various circumstances are respectively generated. Accordingly, the air-conditioning setting can be automatically optimized not only in accordance with a passenger's sensitivity to temperature but also in accordance with specific circumstances.

FIG. 1 is an overall arrangement view showing an air conditioner 1 according to the first embodiment of the present invention. As shown in FIG. 1, the air conditioner 1 includes an air-conditioning unit 10 mainly having a mechanical structure and a controller 60 for controlling the air-conditioning unit 10.

First, a constitution of the refrigerating cycle R of the air-conditioning unit 10 will be explained below. The refrigerating cycle R of the air conditioner 1 is composed of a closed cycle. The closed cycle includes a compressor 11, a condenser 15, a receiver 16, an expansion valve 17 and an evaporator 18. These components are arranged clockwise in the order of compressor 11, condenser 15, receiver 16, expansion valve 17 and evaporator 18. Compressor 11 compresses refrigerant so as to make high pressure gas. Compressor 11 has an electromagnetic clutch 14 which is used for transmitting or shutting off power transmitted from a vehicle engine 13 via a belt 12. Condenser 15 cools and liquidizes refrigerant gas of a high temperature and pressure sent from compressor 11. Receiver 16 stores the liquidized refrigerant. In order to prevent deterioration of the cooling performance, receiver 16 removes bubbles contained in the liquidized refrigerant and only the liquidized refrigerant is sent to expansion valve 17. Expansion valve 17 adiabatically expands the liquidized refrigerant so that the temperature and pressure of the refrigerant can be reduced. After that, the refrigerant of low temperature and pressure is sent to evaporator 18. In evaporator 18, heat is exchanged between the refrigerant of low temperature and pressure and the air sent to evaporator 18, so that the air can be cooled.

Next, a constitution inside the air conditioning case 20 of the air conditioning unit 10 will be explained below. A blower 21 is arranged on the upstream side of the evaporator 18. The blower 21 is composed of a centrifugal fan and driven by a drive motor 22. An inside/outside air switching box 23 is arranged on the suction side of the blower 21. An inside/outside air switching door 25, which is driven by an inside/outside air switching servo motor 24, is arranged in the inside/outside air switching box 23. The inside/outside air switching door 25 opens or closes the inside air intake 26 and the outside air intake 27. Air, which has been taken in through the inside air intake 26 or the outside air intake 27, is sent to the evaporator 18 by the blower 21 through the inside/outside air switching box 23. In this connection, a volume of air sent out from the air conditioner 1 can be adjusted, by adjusting the rotating speed of the blower 21.

On the downstream side of the evaporator 18, an air mixing door 28 and a heater core 29 are arranged in this order from the evaporator 18. In order to heat air passing through the heater core 29, coolant used for cooling the vehicle engine 13 is supplied to the heater core 29 being circulated. In the air conditioning case 20, a bypass passage 30 is arranged which bypasses the heater core 29. The air mixing door 28 is rotated by a temperature control servo motor 31 so as to adjust a ratio of the volume of hot air, which is sent from the passage 32 passing through the heater core 29, to the volume of cold air passing through the bypass passage 30 so that a temperature of air sent out from each blowout port can be adjusted at a predetermined value.

On the downstream side of an air mixing section 33 in which cold air passing through the bypass passage 30 and hot air sent from the passage 32 are mixed with each other, a foot blowout port 34, a face blowout port 35 and a defroster blowout port 36 are provided. The conditioned air is blown out from each blowout port into a passenger room. In the respective blowout ports, a foot door 37, a face door 38 and a defroster door 39 are mounted on the blowout ports, respectively these doors open or close the corresponding blowout ports. In this connection, from the foot blowout port 34, the conditioned air is blown out toward the foot of a passenger sitting on a driver's seat or an assistant's driver's seat. From the face blowout port 35 arranged on the front panel, the conditioned air is blown out toward the driver's seat or the assistant's driver's seat. From the defroster blowout port 36, the conditioned air is blown out toward a windshield. The doors 37, 38, 39 are driven by a mode servo motor 40.

Next, various sensors, which function as an information acquiring unit of the air conditioner 1, will be explained below. The inside air temperature sensor 51 is arranged together with an aspirator on an instrument panel in a neighborhood of a steering wheel so as to measure a temperature $T_r$ in the passenger room. The outside air temperature sensor 52 is arranged in a radiator grill in the front of the vehicle, which is located on a front face of the outside of the condenser 15, so as to measure a temperature $T_{am}$ outside the passenger room. In order to measure an intensity of the sunshine S coming into the passenger room, a sunshine sensor 53 is attached to a neighborhood of the windshield. In this connection, the sunshine sensor 53 is composed of a photo-diode.

In order to measure a temperature of air blown out from the evaporator 18 (an evaporator outlet temperature), an evaporator outlet temperature sensor is provided. In order to measure a coolant temperature of the engine coolant sent to the heater core 29, a heater inlet coolant temperature sensor is provided. In order to measure a pressure of the refrigerant circulating in the refrigerating cycle R, a pressure sensor is provided. At least one in-vehicle camera 54 is arranged in the passenger room and acquires an image of a face of a passenger. This in-vehicle camera 54 also functions as a passenger information acquiring unit. Further, an out-vehicle camera 55 is provided and acquires an image of the scene around the vehicle.

The air conditioner 1 acquires sensing information from each sensor described above. Further, the air conditioner 1 acquires locational information such as information of the present location of the vehicle, information of the advancing direction of the vehicle, information concerning the periphery region and Gbook information from a navigation system 56. The air conditioner 1 also acquires various operation information such as a degree of opening of an accelerator, a rotation angle of a steering wheel, a position of a brake pedal, a degree of opening of a power window, and ON/OFF of a wiper, a turning lever or a car audio set, and vehicle motion information such as vehicle speed, from a vehicle operating device 57. Further, the air conditioner 1 acquires time information such as day of the week and a present time from an on-vehicle clock 58. An electrocardiograph detection sensor, a heart beat and respiration sensor, a body heat sensor or skin heat sensor may be arranged in the driver's seat so that the air conditioner 1 can acquire biological information of a passenger. As described above, the navigation system 56, the vehicle operating device 57 and the on-vehicle clock 58 also function as the information acquiring unit.

Figure 2:
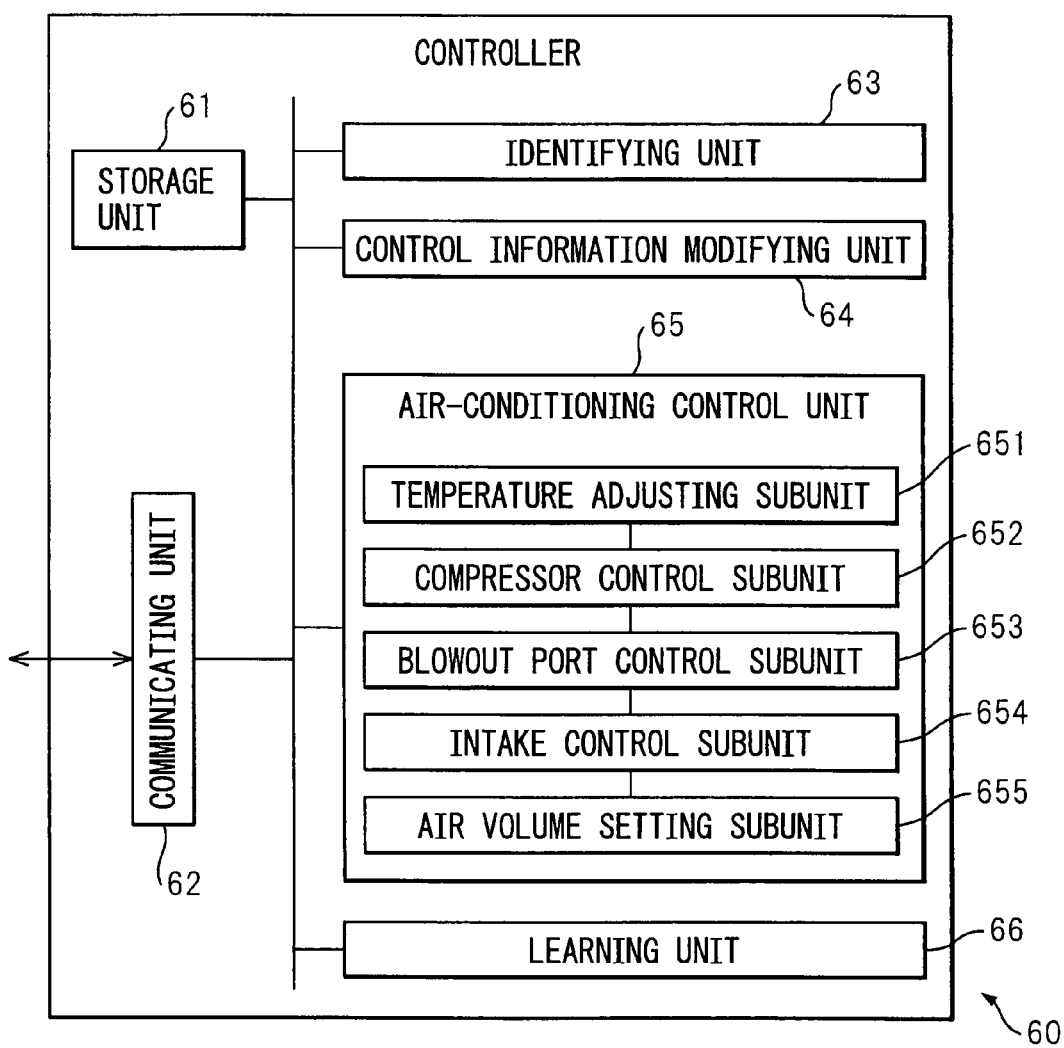
FIG. 2 shows a functional block diagram of a controller of the air conditioner.

FIG. 2 is a functional block diagram of the controller 60 of the air conditioner 1.

The controller 60 includes one or a plurality of microcomputers composed of CPU, ROM and RAM (not shown), peripheral circuits of the microcomputers, a storage unit 61 such as a nonvolatile memory which is electrically rewritable; and a communicating unit 62 for communicating with various sensors, the navigation system 56 or the vehicle operating device 57 according to the on-vehicle communication standard such as a control area network (CAN).

Further, the controller 60 includes a identifying unit 63, a control information modifying unit 64, an air-conditioning control unit 65, and a learning unit 66, which are functional modules implemented by the microcomputer and the computer program executed in the microcomputer.

The controller 60 temporarily stores state information such as sensing information, locational information and motion information of the vehicle, which are obtained from the vehicle operating device and so on, in RAM. In the same manner, the controller 60 temporarily stores an operating signal, which are acquired from A/C operation panel 59 which is the operating unit, in RAM. The controller 60 controls the air-conditioning unit 10 based on the state information and the operating signal. For example, the controller 60 controls the electromagnetic clutch 14 to turn on/off the compressor 11. Further, the controller 60 controls the drive motor 22 for adjusting a rotating speed of the blower 21. The controller 60 also controls an inside/outside air switching servo motor 24, a temperature control servo motor 31 and a mode servo motor 40 so as to adjust a degree of opening of each door. The controller 60 adjusts a ratio of the air volume of the conditioned air blown out from each blowout port, an entire air volume and the temperature of conditioned air so that a temperature of the passenger room can be close to a temperature, which was set by the passenger, by executing the control process described above. In this connection, in order for the controller 60 to decide temperature and air volume of the conditioned air, the controller 60 inputs predetermined state information into a usable probabilistic model and estimates a probability that the passenger executes a predetermined operation such as decreasing the setting temperature, maximizing an air volume and setting recirculation mode. When the probability is equal to or more than a predetermined threshold value, the controller 60 automatically executes the predetermined setting operation.

Further, when the passenger operates the air conditioner 1 via A/C operation panel 59, the controller 60 accumulates the contents of operation and various information obtained at the time of the operation. When the number of accumulated pieces of such information reaches a predetermined number, the controller 60 performs a statistical learning process to generate a probabilistic model. Each functional module will be explained below.

The identifying unit 63 identifies and authenticates the passenger based on an image acquired by the in-vehicle camera 54 and identification information of a registered user that has been previously registered in the air conditioner 1, when an engine switch is turned on. Then, the identifying unit 63 judges whether or not the passenger matches a registered user. Then, the identifying unit 63 reads out identification information (ID) of the matched registered user and also reads out personal information related to the matched registered user from the storage unit 61.

For example, the identifying unit 63 identifies and authenticates the passenger by the following method. The identifying unit 63 binarizes the image acquired by the in-vehicle camera 54 or detects edges of the image in order to recognize a region corresponding to the face of the passenger. The identifying unit 63 then detects characteristic portions such as eyes, nose and lips from the recognized face region by means of edge detection. In this way, the identifying unit 63 extracts the sizes of each characteristic portion and positional relationship between each characteristic portion as a set of feature amounts. The identifying unit 63 compares the extracted set of feature amounts with predetermined set of feature amounts with respect to each registered user which is stored in the storage unit 61 and calculates a matching degree using a correlation function. When the highest matching degree is not less than a predetermined threshold value, the identifying unit 63 authenticates the passenger as a registered user corresponding to the highest matching degree. In this connection, the above identifying method is described as an example. It is possible for the identifying unit 63 to identify and authenticate the passenger using another well known identifying method. For example, the identifying unit 63 can use the face authentication system for a vehicle described in Japanese unexamined patent publication No. 2005-202786. Further, the identifying unit 63 can use a authentication method without the image matching. For example, the identifying unit 63 may identify and authenticate the passenger using a smart key system. Further, in a car theft prevention device for a vehicle as described in Japanese unexamined patent publication No. 2005-67353, the passenger may be identified and authenticated using both the smart key system and the image authentication. Further, the identifying unit 63 may use a vein pattern of a palm or a finger, or a finger print which are read out by a sensor in order to identify and authenticate the passenger.

The control information modifying unit 64 decides whether or not the setting parameters of the air conditioner 1 such as setting temperature $T_{set}$ and air volume W, are automatically adjusted based on a probabilistic model. The setting parameters are the setting information of which the passenger can change the value. In other words, the control information modifying unit 64 has at least one probabilistic model related to a predetermined setting operation and inputs the state information into the at least one probabilistic model to calculate a probability that a predetermined setting operation is performed. The control information modifying unit 64 then modifies the setting information or the control information related to the predetermined setting operation based on the probability and the modifying information related to the probabilistic model. In this connection, the modifying information comprises a value of the setting information or the control information to be set in the predetermined setting operation. Alternatively, the modifying information comprises a value of modification to be added to or to be multiplied by the value of the setting information or the control information so that the setting information or the control information are changed to a desired modifying value.

In the present embodiment, Bayesian Network is used as a probabilistic model. The Bayesian Network makes a model which indicates a probabilistic causality of a plurality of phenomena. The Bayesian Network is expressed by a non-circulation directed graphical model. In the Bayesian Network, a transmission between nodes of the graphical model can be determined by conditional probability. In this connection, the Bayesian Network is described in detail in the following documents:

"Technique of Bayesian Network" by Yoichi Kimura and Hirotoshi Iwasaki, the first edition published by Denkidai Shuppannkyoku, July, 2006;

"Outline of Bayesian Network" by Masao Shigemasu and others, the first edition, published by Baifukan, July, 2006; and "Pattern Classification" by R. O. Duda, P. E. Hart and D. G. Stork, published by Shingijutsu Communications, 2000.

In the present embodiment, the probabilistic model is generated for each user registered in the air conditioner 1. Further, the probabilistic model is generated for each setting operation (for example, the operation that lowers or raises the setting temperature $T_{set}$, adjusts the air volume W or sets recirculation mode). The storage unit 61 stores the structural information of the probabilistic model with the user information and the setting operation. Specifically, the storage unit 61 stores a graph structure which indicates a connection between each node composing the probabilistic model, a type of the input information given to the input nodes and a conditional probabilistic table, which is referred to as CPT hereinafter, with respect to each node of the probabilistic model. Further, a identification number (ID) of a user, a setting operation number k uniquely corresponding to the contents of the setting operation, a setting parameter modified by the setting operation and the modified value of the setting parameter are prescribed with respect to each probabilistic model and stored in the storage unit 61. For example, when the setting temperature $T_{set}$ is decreased by 3° C., the set of the setting parameter and the modified value is shown as ($T_{set}$, −3). When the air volume W is set to the maximum value $W_{max}$, the set of the setting parameter and the modified value is shown as (W, $W_{max}$).

The control information modifying unit 64 reads out the probabilistic models, which are related to the registered user identified as the passenger by the identifying unit 63, from the storage unit 61. The control information modifying unit 64 then inputs the predetermined state information into the respective probabilistic models to determine a probability that the passenger executes the setting operation related to each probabilistic model (i.e. a probability or a probability of appearance). In other words, the control information modifying unit 64 determines a probability that the passenger executes the setting operation which is uniquely prescribed for each probabilistic model, indicated by the setting operation number k which is stored in the storage unit 61 together with the corresponding probabilistic model. This probability can be calculated, for example, using belief propagation. When the determined probability is equal to or more than the first threshold value $T_{h1}$ (for example, $T_{h1}$=0.9), in other words, when it appears that the passenger executes the setting operation, the control information modifying unit 64 automatically executes the setting operation. Specifically, the control information modifying unit 64 modifies the setting parameter, which is related to the setting operation, using the modified value of the setting parameter related to the probabilistic model (i.e. the setting parameter which is uniquely prescribed with respect to the probabilistic model and stored in the storage unit 61 together with the probabilistic model).

When although the determined probability is lower than the first threshold value $T_{h1}$, and is equal to or more than the second threshold value $T_{h2}$ (for example, $T_{h2}$=0.6), in other words, when it expects that the passenger executes the setting operation, the control information modifying unit 64 displays the contents of the setting operation via the display unit such as A/C operation panel 59 or navigation system 56, so that the contents of the setting operation are informed to the passenger. Then, the control information modifying unit 64 confirms whether or not the passenger executes the setting operation. When the passenger executes an operation for agreeing to perform the setting operation via A/C operation panel 59 (for example, the passenger pushes a predetermined operation button), the control information modifying unit 64 executes the setting operation. The control information modifying unit 64 may inform the passenger of the contents of the setting operation by voice via A/C operation panel 59 or navigation system 56. If a microphone is connected to the air conditioner 1 and a voice recognition program is mounted on the controller 60, the control information modifying unit 64 may confirm whether or not the setting operation is executed, responding to a voice of the passenger.

An example is explained here in which the setting temperature $T_{set}$ is lowered by 3° C. In this case, the first threshold value $T_{h1}$ is 0.9 and the second threshold value $T_{h2}$ is 0.6.

Figure 3:
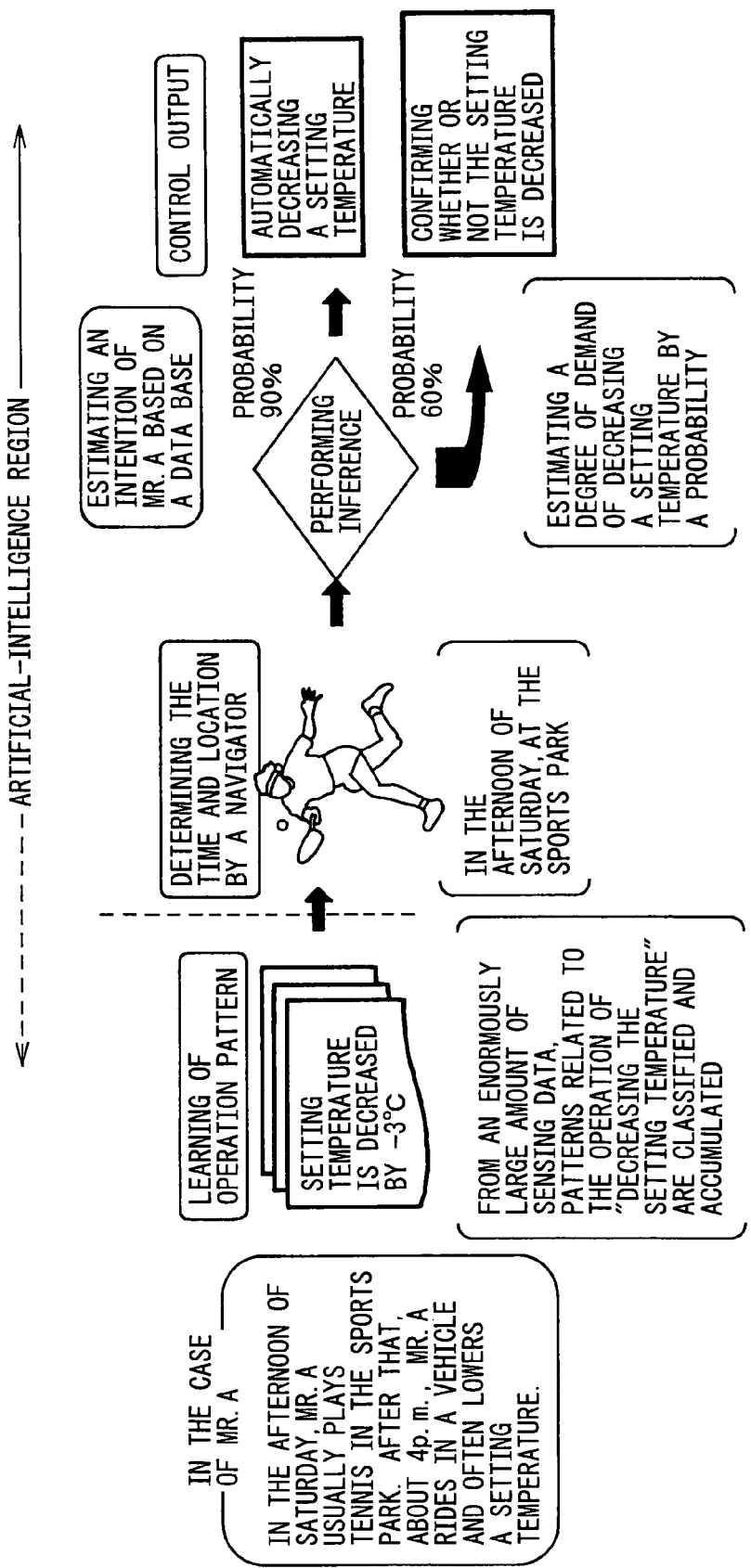
FIG. 3 shows an example of specific circumstances.

FIG. 3 shows an example of the specific circumstances. In the circumstances shown here, passenger A always plays tennis in a sports park on Saturday afternoon and then rides in his car at about 4 p.m. In this circumstance, it is assumed that the passenger A likes to lower the setting temperature of the air conditioner to be lower than usual setting temperature. On the other hand, in other cases, the passenger A does not execute such setting operation of the air conditioner, for example, when passenger A returns home from the office, passenger A does not execute such setting operation.

Figure 4:
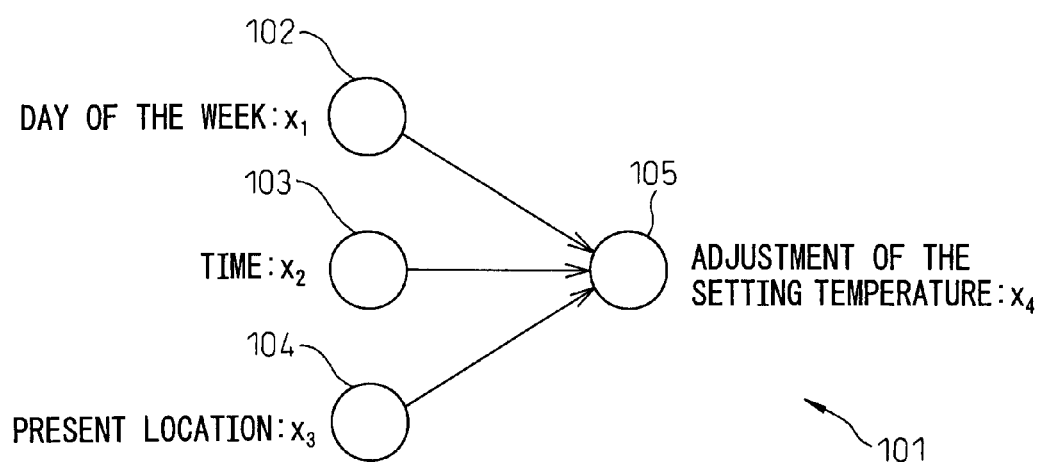
FIG. 4 shows a graph structure of an example of a probabilistic model used for automatically adjusting a setting value of the air conditioner.
Figure 6C:
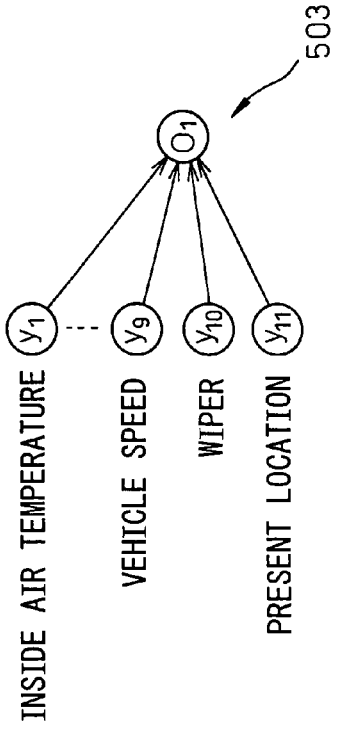
FIGS. 6A to 6D show a standard model having a graph structure which is a base of a probabilistic model.
Figure 6D:
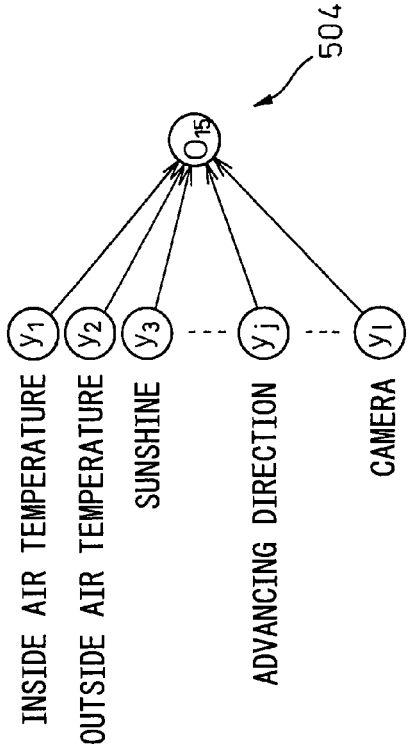
Figure 6A:
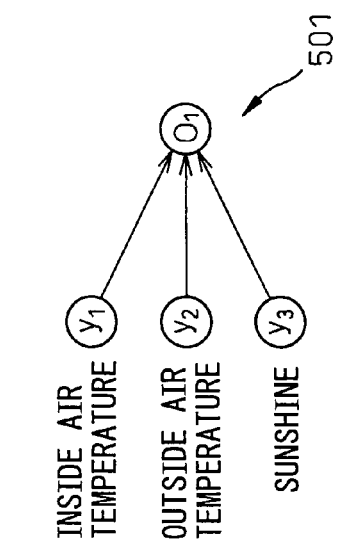
Figure 6B:
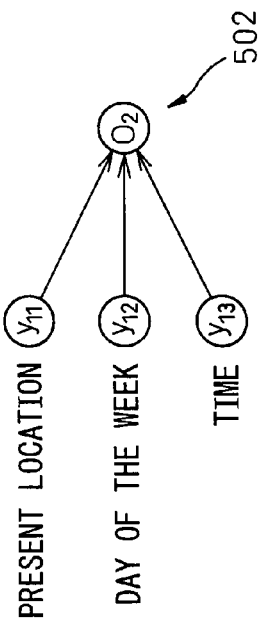

FIG. 4 shows an example of the graph structure of the probabilistic model used for automatically adjusting the setting parameter of the air conditioner 1. In the probabilistic model 101 shown in FIG. 4, three input nodes 102, 103, 104 are respectively connected to the output nodes 105. A day of the week (x1), a time zone (x2) and a present location (x3) which are pieces of state information are inputted into the input nodes 102, 103, 104, respectively. The output node 105 outputs a probability to lower the setting temperature $T_{set}$ by 3° C.

FIGS. 5A to 5D shows CPT 106 to 109 with respect to each node of the probabilistic model 101 shown in FIG. 4. CPT 106 to 108 respectively correspond to the input nodes 102 to 104. CPT 106 to 108 prescribe a prior probability with respect to the state information to be inputted. CPT 109 corresponds to the output node 105 and prescribes a conditional probability distribution assigned to values of the state information which are inputted into each input node.

When all information given to the input nodes is already known, the day of the week is Saturday ($x_1=1$), the time is daytime ($x_2=1$) and the present location is the park ($X_3=1$), the probability $P(x_4=1|x_1=1, x_2=1, x_3=1)$ that the setting temperature $T_{set}$ will be decreased by 3° C. is 0.95, as shown in FIG. 5D. Accordingly, since the obtained probability is not less than the first threshold value $T_{h1}$, the control information modifying unit 64 modifies the setting parameter so that the setting temperature $T_{set}$ is decreased by 3° C.

As other example, when the day of the week is Saturday ($x_1=1$) and the time is daytime ($x_2=1$) and the present location is unknown since the navigation system 56 is turned off, $P(x_4=1|x_1=1, x_2=1, x_3)$ is calculated using the prior probability $P(x_3)$ with respect to the present location as shown in FIG. 5C, as follows:

$$P(x_4 = 1 | x_1 = 1, x_2 = 1, x_3) =$$
$$P(x_4 = 1 | x_1 = 1, x_2 = 1, x_3 = 1) \cdot P(x_3 = 1) +$$
$$P(x_4 = 1 | x_1 = 1, x_2 = 1, x_3 = 0) \cdot P(x_3 = 0) =$$

$$0.95 \cdot 0.15 + 0.55 \cdot 0.85 = 0.61$$

Accordingly, the obtained probability is lower than the first threshold value $Th_1$; however, the obtained probability is higher than the second threshold value $Th_2$. Therefore, the control information modifying unit 64 confirms whether or not the setting temperature $T_{set}$ is decreased by 3° C., with the passenger via the passenger via A/C operation panel 59.

Further, when the day of the week is Monday ($x_1=0$), the time is night ($x_2=0$) and the present location is an office ($x_3=0$), the probability $P(x_4=1|x_1=0, x_2=0, x_3=0)$ that the setting temperature is decreased by 3° C., is 0.1, as shown in FIG. 5D. Accordingly, since the obtained probability is lower than the first threshold value $T_{h1}$ and the second threshold value $T_{h2}$, the control information modifying unit 64 does not change the setting temperature $T_{set}$. Further, the control information modifying unit 64 does not inform the passenger whether or not the setting temperature $T_{set}$ is changed.

In addition, in the above example, in order to simplify the explanation, a probabilistic model is composed of two layer network. However, the probabilistic model may comprise three or more layers of network containing an intermediate layer. With respect to the day of the week which is used as the input information, the days of the week are classified into two segments (i.e. Saturday and other days). However, the classification of the days of the week is not limited to the above specific example. For example, the days of the week may be classified into seven segments, each segment corresponding to one of day of the week, respectively. In the same manner, with respect to the present location, the present location is not necessarily classified into the park and the others. The present location may be classified into each location to which the passenger frequently visits. With respect to time, the time may be more finely classified. Alternatively, the time may be classified into morning and afternoon.

When there are a plurality of probabilistic models related to the same operation group (ex. the groups are classified into modification of the setting temperature, change in the air volume, inside/outside air selecting and setting a ratio of the air volume.), in other words, when there are a plurality of probabilistic models for outputting a probability to modify a specific setting parameter, the control information modifying unit 64 calculates the probabilities with respect to the plurality of probabilistic models. In this connection, the specific setting parameters include parameters which indicate the air volume, the inside/outside air selecting and the ratio of the air volume, respectively. The control information modifying unit 64 selects the maximum probability from the obtained probabilities and executes the above process relating to the maximum probability. For example, it is assumed that there are two probabilistic models with respect to the air volume setting. One probabilistic model M1 of them is for maximizing air volume W and the other probabilistic model M2 is for setting the level of air volume W to middle level. In this case, the control information modifying unit 64 determines a probability $P_{M1}$ that the air volume W is maximized based on the probabilistic model M1. In the same manner, the control information modifying unit 64 determines a probability $P_{M2}$ that the level of air volume W is set to middle level based on the probabilistic model M2. When $P_{M1}$ is higher than $P_{M2}$, the control information modifying unit 64 compares $P_{M1}$ with the threshold values $T_{h1}$, $T_{h2}$ and decides whether or not the air volume W is maximized. On the contrary, when $P_{M2}$ is higher than $P_{M1}$, the control information modifying unit 64 compares $P_{M2}$ with the threshold values $T_{h1}$, $T_{h2}$ and decides whether or not the level of air volume W is set to middle level.

In above example, in order to facilitate the understanding, it is prescribed so that the probabilistic models M1 and M2 are related to different setting operations from each other. However, the setting operation relating to the probabilistic model M1 may be same as that relating to the probabilistic model M2 (for example, the setting operations relating to the model M1 and M2 are for maximizing the air volume W, respectively). In this case, the passenger may perform the same operation in two different circumstances (for example, one circumstance in which the time zone is the daytime and the weather is fine, and the other circumstance in which the passenger is returning home from a sports gymnasium). If the probabilistic models corresponding to the respective circumstances have been generated, the generated probabilistic models are related to the setting operation belonging to the same operation group.

When the control information modifying unit 64 modifies the setting parameters such as a setting temperature $T_{set}$ and an air volume W by the process described above according to the necessity, the setting parameters are temporarily stored in RAM of the controller 60 so that the setting parameters can be used in each unit of the controller 60.

The air-conditioning control unit 65 reads out the value of each setting parameter and the sensing information, which is acquired from each sensor, from RAM. According to those values, the air-conditioning control unit 65 controls the air-conditioning unit 10. Therefore, the air-conditioning control unit 65 includes a temperature adjusting subunit 651, a compressor control subunit 652, a blowout port control subunit 653, a intake control subunit 654 and an air volume setting subunit 655. When the setting parameters modified by the control information modifying unit 64 are stored in RAM of the controller 60, the air-conditioning control unit 65 reads out the modified parameters to uses them.

The temperature adjusting subunit 651 decides a temperature of the conditioned air blown out from each blowout port (so-called air-conditioning temperature $T_{ao}$) based on the setting temperature $T_{set}$ and the measurement signals sent from each temperature sensor and the sunshine sensor 53. The temperature adjusting subunit 651 decides a degree of opening of the air mixing door 28 so that a temperature of the conditioned air is equal to the decided air-conditioning temperature $T_{ao}$. The temperature adjusting subunit 651 then sends a control signal to the temperature adjusting servo motor 31 so that the position of the air mixing door 28 corresponds to the degree of opening. For example, the degree of opening of the air mixing door 28 can be decided by a relational equation, the input of the equation is a value obtained by correcting a difference between the inside air temperature $T_r$ and the setting temperature $T_{set}$ using the outside air temperature $T_{am}$ and the sunshine S, and the output of the equation is the degree of opening of the air mixing door 28. In addition, the temperature adjusting subunit 651 decides the degree of opening of the air mixing door 28 every constant intervals, for example the interval is 5 seconds. The relational equation between each measurement value and the degree of opening of the air mixing door 28 for controlling the air mixing door 28 in such a manner will be shown below.

$$T_{ao}=k_{set}T_{set}-k_rT_r-k_{am}T_{am}-k_sS+C$$

$$D_o=aT_{ao}+b$$

wherein, $D_o$ represents the degree of opening of the air mixing door 28. Coefficients $k_{set}$, $k_r$, $k_{am}$, $k_s$ and $C_{a,b}$ are constants. $T_{set}$, $T_r$, $T_{am}$ and S respectively represent a setting temperature, an inside air temperature, an outside air temperature and a sunshine. When the control information modifying unit 64 modifies the setting temperature $T_{set}$, the temperature adjusting subunit 651 uses the modified setting temperature $T_{set}$. The degree $D_o$ of opening of the air mixing door 28 is set to 0% when the passage 32 passing through the heater core 29 is closed (cooling operation is only performed), and the degree $D_o$ is set to 100% when the bypass passage 30 is closed (heating operation is only performed). Coefficients $k_{set}$, $k_r$, $k_{am}$, $k_s$ and C of the temperature controlling equation and coefficients a and b of the relational equation for determining the degree of opening of the air mixing door are provided with each registered user as temperature control parameters. The parameters are included in the personal setting information of the registered user.

In addition, the temperature adjusting subunit 651 may decide the air-conditioning temperature $T_{ao}$ and the degree of opening of the air mixing door 28 using another well known controlling method such as a method of control in which a neural network is used or a method of fuzzy control. The calculated air-conditioning temperature $T_{ao}$ is stored in the storage unit 61 so that it can be referred in the other units of the controller 60.

The compressor control subunit 652 turns on/off the compressor 11 based on the air-conditioning temperature (the necessary blowout port temperature) $T_{ao}$ determined by the temperature adjusting subunit 651, the setting temperature $T_{set}$ and the evaporator outlet temperature. When the passenger room is cooled or the defroster is operated, the compressor control subunit 652 makes the compressor 11 operate in principle so that the refrigerating cycle R operates. However, in order to prevent the evaporator 18 from frosting over, when the evaporator outlet temperature decreases close to a temperature at which the evaporator 18 frosts over, the compressor control subunit 652 stops the compressor 11. After that, when the evaporator outlet temperature is somewhat raised, the compressor control subunit 652 restarts compressor 11. In this connection, the compressor 11 can be controlled using a well-known method such as a variable volume control. Therefore, the details of controlling the compressor are not explained hereafter.

The blowout port control subunit 653 determines an air volume ratio of the conditioned air blown out from each blowout port based on the determined ratio of the air volume that has been set by a passenger via A/C operation panel 59, the air-conditioning temperature $T_{ao}$ determined by the temperature adjusting subunit 651 and the setting temperature $T_{set}$. The blowout port control subunit 653 decides degrees of opening of the foot door 37, the face door 38 and the defroster door 39 so that the degrees of opening correspond to the air volume ratio. The blowout port control subunit 653 decides the degrees of opening of the doors 37 to 39 according to a relational equation which defines a relationship between the setting value of the air volume ratio, the air-conditioning temperature $T_{ao}$, and the setting temperature $T_{set}$, and the degrees of opening of the doors 37 to 39. This relational equation is previously prescribed and incorporated into a computer program executed by the controller 60. In this connection, the blowout port control subunit 653 can decide the degrees of opening of the doors 37 to 39 using another well known method. The blowout port control subunit 653 controls the mode servo motor 40 so that the degrees of opening of the doors 37 to 39 are the decided values, respectively. When the control information modifying unit 64 modifies the setting value of the air volume ratio or the setting temperature $T_{set}$, the blowout port control subunit 653 decides the degrees of opening of the doors 37 to 39 using the modified setting value or the modified setting temperature $T_{set}$.

The intake control subunit 654 sets a ratio of the air sucked from the inside air intake 26 to the air sucked from the outside air intake 27 based on the intake setting acquired from A/C operation panel 59, the setting temperature $T_{set}$, the air conditioning temperature $T_{ao}$ and the inside air temperature $T_r$. The intake control subunit 654 decides a degree of opening of the inside/outside air switching door 25 according to a relational equation which defines a relationship between a difference from the outside air temperature $T_{am}$/the inside air temperature $T_r$ to the setting temperature $T_{set}$, and the air suction ratio. This relational equation is previously prescribed and incorporated into the computer program executed by the controller 60. In addition, the intake control subunit 654 may decide the degree of opening of the inside/outside air switching door 25 by another well known method. The intake control subunit 654 controls the inside/outside air switching servo motor 24 and rotates the inside/outside air switching door 25 so that the suction ratio is the obtained value. When the control information modifying unit 64 modified the value of intake setting or the setting temperature $T_{set}$, the intake control subunit 654 decides the degree of opening of the inside/outside air switching door 25 using the modified value of intake setting or the setting temperature $T_{set}$.

The air volume setting subunit 655 decides a rotating speed of the blower 21 based on the air volume W acquired from A/C operation panel 59, the setting temperature $T_{set}$, the air-conditioning temperature $T_{ao}$, the inside air temperature $T_r$, the outside air temperature $T_{am}$ and the sunshine S. The air volume setting subunit 655 sends a control signal to the drive motor 22 so that the rotating speed of the blower 21 is the setting value. For example, when the air volume W is determined by manual setting mode, the air volume setting subunit 655 decides the rotating speed of the blower 21 so that the rotating speed corresponds to the air volume W acquired from A/C operation panel 59. When the air volume W is determined by the automatic setting mode, the air volume setting subunit 655 decides the rotating speed of the blower 21 according to an air volume controlling equation which defines a relationship between the inside air temperature $T_r$, the air-conditioning temperature $T_{ao}$ and the air volume W. Alternatively, the air volume setting subunit 655 may use an air volume controlling equation which directly defines a relationship between the setting temperature $T_{set}$, the air-conditioning information (the inside air temperature $T_r$ and the outside air temperature $T_{am}$ and the sunshine S), and the air volume W. The air volume setting subunit 655 can use various well known air volume controlling equations. In this connection, this air volume controlling equation is previously prescribed and incorporated into the computer program executed in the controller 60. Alternatively, the air volume setting subunit 655 may decide the rotating speed of the blower 21 based on a map control for deciding the air volume W corresponding to the air-conditioning information by referring to a map which prescribes a relationship between the air-conditioning information and the air volume W. Further, the air volume setting subunit 655 may decide the rotating speed of the blower 21 using another well known method. When the control information modifying unit 64 modified the air volume W or the setting temperature $T_{set}$, the air volume setting subunit 655 decides the rotating speed of the blower 21 using the modified air volume W or the setting temperature $T_{set}$.

The learning unit 66 judges whether or not a new probabilistic model is generated or whether or not an existing probabilistic model is updated when the passenger operates the air conditioner 1. When the learning unit 66 judged that the probabilistic model should be generated or updated, the learning unit 66 generates a new probabilistic model or updates the existing probabilistic model.

In general, when an air-conditioning state in a passenger room is not appropriate for a passenger, the passenger performs a setting operation of the air conditioner 1. Therefore, when the passenger frequently executes the setting operation of the air conditioner 1, it is necessary to build a probabilistic model to estimate the setting operation for the passenger. However, in order to build an appropriate probabilistic model, it is necessary to obtain enough data for an accurate statistical estimation. Therefore, the learning unit 66 stores the state information, which was obtained when the passenger performed any setting operation, as learning information $D_{AK}$ in the storage unit 61. For example, the state information includes air-conditioning information such as outside air temperature $T_{am}$, locational information such as the present location of the vehicle, vehicle motion information such as the vehicle speed and biological information such as a number of heart beats. Further, the learning information $D_{AK}$ is related to the setting operation number k and ID number of the passenger. The number $i_{AK}$ of times of the setting operation α (for example, to lower the setting temperature by 3° C. or to maximize the air volume W) which is executed by a passenger (for example, a passenger A) is also stored in the storage unit 61. In this connection, the learning information $D_{AK}$ is expressed as follows.

$$D_{Ak} = \begin{pmatrix} d_{11k} & d_{12k} & d_{13k} & \cdots & d_{11k} \\ d_{21k} & d_{22k} & & \cdots & d_{21k} \\ d_{31k} & & \ddots & & \\ \vdots & & & d_{ijk} & \\ d_{m1k} & & & & d_{mlk} \end{pmatrix}$$

wherein $d_{ijk}$ is a value of each information. "i" is the number $i_{AK}$ of times of the setting operation. "j" is a state item number conveniently designated to each value of the state information. In the present embodiment, the inside air temperature $T_r$, is assigned to j=1. In the same manner, the outside temperature $T_{am}$, is assigned to j=2. The sunshine S, is assigned to j=3. The locational information, the vehicle motion information and the biological information are assigned to j=4 or more large number. "k" is a setting operation number.

The learning information $D_{AK}$ and the number $i_{AK}$ of times of operation are stored for each registered user and setting operation, respectively.

When the number $i_{AK}$ of times of operation is equal to the predetermined number n1 (for example, n1=10), the learning unit 66 builds a probabilistic model $M_{Aqk}$ with respect to the setting operation using the learning information $D_{Ak}$ stored in the storage unit 61. In this connection, q (=1, 2, . . . ) represents the number of the probabilistic model built with respect to the setting operation α (the setting operation number k) by the passenger A. After that, when passenger A repeats the setting operation α, each time when the number $i_{Ak}$ reaches the predetermined number n1 after the previous probabilistic model $M_{Aqk}$ has been built, in other words, each time when the number of times of operation $i_{Ak}$=n1·j (j=1, 2, ·), the learning unit 66 updates the probabilistic model $M_{Aqk}$ using the learning information $D_{Ak}$ stored in the storage unit 61.

When the number $i_{Ak}$ of times of operation reaches the predetermined number n2 (for example, n2=30), the learning unit 66 determines that the probabilistic model $M_{aqk}$, which is stored in the storage unit 61, has been established. After that, the learning unit 66 does not update the probabilistic model $M_{Aqk}$. The learning unit 66 deletes the learning information $D_{Ak}$ stored in the storage unit 61 and initializes the number $i_{Ak}$ and then the value of $i_{Ak}$ is reset to 0. In this connection, the predetermined number n2 is larger than the number n1 and corresponds to the enough number of data for building a statistically accurate probabilistic model. The predetermined numbers n1 and n2 can be optimized based on experience and experiment.

The learning unit 66 attaches flag information, which indicates whether or not the established probabilistic model $M_{Aqk}$ is updated, to the probabilistic model $M_{Aqk}$. The updating flag is related to the probabilistic model and stored in the storage unit 61. For example, when the updating flag f is '1', it indicates that updating of the corresponding probabilistic model is prohibited, in other words, rewriting the corresponding probabilistic model is prohibited. On the other hand, when updating flag f is '0', it indicates that updating of the corresponding probabilistic model is allowable. Therefore, by referring to updating flag f, the learning unit 66 can judge whether or not the corresponding probabilistic model can be updated. When a new probabilistic model is generated, the learning unit 66 provides a updating flag f corresponding to the new probabilistic model and sets the value of the updating flag f to '0'. After that, when the number of times of operation corresponding to the probabilistic model reaches the predetermined number n2, the learning unit 66 rewrites the value of the corresponding updating flag f to '1'.

When passenger A repeats the setting operation α after the probabilistic model $M_{Aqk}$ relating to the setting operation α was established, the learning unit 66 generates a new probabilistic model $M_{Aq+1k}$ according to the method as described above. By generating a plurality of probabilistic models if necessary, even when a plurality of specific circumstances exist, in which the same type of setting operation is executed (for example, when the vehicle enters a tunnel or the vehicle is running behind a large truck, the setting operation for setting the recirculation mode is performed), the learning unit 66 can optimize the air-conditioning setting to each specific circumstance. With respect to the specific circumstances which frequently occurs, a large number of pieces of state information corresponding to the specific circumstances are contained in the learning information. Therefore, the probabilistic model corresponding to the frequent specific circumstances can be early built. With respect to the specific circumstances for which the corresponding probabilistic model has been built, the controller 60 automatically executes the setting operation by the probabilistic inference based on the probabilistic model. Therefore, the passenger needs not execute the setting operation of the air conditioner 1 with respect to the specific circumstances. Accordingly, as the learning advances, only when unusual specific circumstances occurs, the passenger may execute the setting operation. Therefore, the learning unit 66 can also build a probabilistic model corresponding to the unusual specific circumstances.

Next, a procedure of building the probabilistic model will be explained below.

In order to build a probabilistic model capable of coping with various circumstances, it is necessary to build a very large probabilistic model containing a large number of nodes. However, in order to learn such a large probabilistic model, a very long period of time for calculation is required. Further, a powerful hardware resource is required for learning. Therefore, in the present embodiment, the learning unit 66 builds a probabilistic model for calculating a probability of one setting operation with respect to one specific circumstance. In addition, fifteen types of standard models, which are the basis of the probabilistic model, are prepared. Each standard model has a graph structure of two-layer structure. Some pieces of state information deeply related to the setting operation are selected as input parameters of each standard model. Further, each standard modes calculates a probability of executing the setting operation as a conditional probability for a combination of the input parameters. However, the number of the standard models is not limited to 15 types. The number of the standard models can be optimized according to the number of pieces of state information obtained and the type of the setting operation which is an object of learning. Some standard models may be inputted one parameter. Alternatively, some standard models may use all of the acquired state information as the input parameters. Further, the standard model is not limited to the graph structure of the two-layer structure. According to a capability of CPU composing the controller 60, the graph structure of three layers or more may be employed for the standard model.

These standard models are stored in the storage unit 61. At the time of learning, with respect to each standard model, the learning unit 66 decides a conditional probability table (CPT) of each node contained in the standard model and builds a temporary probabilistic model. After that, the learning unit 66 selects a temporary probabilistic model having the most appropriate graph structure using the information criterion. The thus selected model is the probabilistic model which is used by the controller 60.

Referring to the drawings, a detailed explanation is as follows.

In FIGS. 6A to 6D, 4 standard models, which are included in fifteen standard models, are shown as examples. Standard models 501 to 504 shown in FIGS. 6A to 6D are Bayesian Network of two-layer structure composed of some input nodes and an output node. Parameters given to the input nodes of the standard models 501 to 504 are different from each other.

With respect to each input node of the standard models 501 to 504, CPT is set which prescribes a prior probability for the input parameter assigned to the input node. In this connection, for example, the classification of input information is decided using clustering method. For example, the learning unit 66 executes clustering of the present location information included in the learning information using the k-means method, with respect to the input node into which the present location is inputted as the input parameter (parameter $Y_{11}$) in the standard model 502 shown in FIG. 6B. The learning unit 66 then decides a classification of each segment of the parameter values based on ranges of the parameters corresponding to the clusters. Alternatively, the classification of parameter values may be predefined in such a manner that $y_{11}=0$ in the home, $y_{11}=1$ in the office and $y_{11}=2$ in the nearby park. In the same manner, with respect to the output node, the learning unit 66 sets a CPT which indicates a distribution of the conditional probability for the input parameters given to the input nodes that a predetermined setting operation is performed. In this connection, at the initial stage, the CPT is set so that the CPT outputs same probability with respect to any value of the input parameters.

Figure 7:
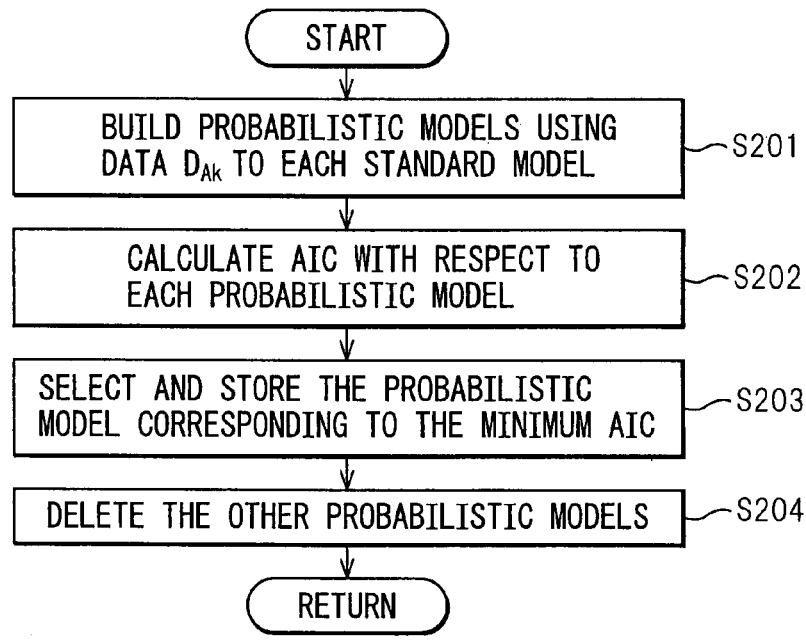
FIG. 7 shows a flow chart of the procedure for generating a probabilistic model of an air conditioner according to the first embodiment of the present invention.

FIG. 7 shows a flow chart of a procedure of building a probabilistic model.

When learning is started, the learning unit 66 extracts the input parameters relating to each standard model from the learning information $D_{Ak}$ and determines conditional probabilities with respect to each node of each standard model in order to make the CPTs. The learning unit 66 then builds temporary probabilistic models (step S201).

In this connection, with respect to each node, the learning unit 66 counts number n of parameters included in each segment of value of the parameter which is extracted from the learning information $D_{Ak}$ which was read out from the storage unit 61. Then, the learning unit 66 determines a value which is obtained by dividing number n by number N of total events as a value of the prior probability or a value of the conditional probability. As example, the standard model 502 shown in FIG. 6B will be explained as follows. In this case, it is assumed that the learning information $D_{Ak}$ contains 30 sets of data. In this case, with respect to the present location assigned to one of the input nodes, it is assumed that the number of the present location which is in the home ($y_{11}=0$) is 15, the number of the present location which is in the office ($y_{11}=1$) is 12, and the number of the present location which is in the nearby park ($y_{11}=2$) is 3. In this case, the prior probability $P(y_{11})$ with respect to the present location is respectively $P(y_{11}=0)=0.5$, $P(y_{11}=1)=0.4$, and $P(y_{11}=2)=0.1$. In the same manner, with respect to the output node, the learning unit 66 calculates appearance numbers of parameters included in combinations of each segment of values of the present location ($y_{11}$), the day of the week ($y_{12}$) and the time zone ($y_{13}$) from the learning information $D_{ak}$. The parameters $y_{11}$, $y_{12}$ and $y_{13}$ are the input parameters given to each input node which is a parent node of the output node. Then, the learning unit 66 determines a conditional probability corresponding to the combination by dividing the appearance number by the total number (=30) of data sets included in the learning information $D_{Ak}$. The learning unit 66 determines the CPT corresponding to each node, based on the prior probability and the conditional probability which are determined in this way.

When it appears that the number of data used for learning is not large enough, the learning unit 66 may estimate the probability distribution using β distribution. When the learning information $D_{Ak}$ does not contain a combination of any values of input information, in other words, unobserved data exists, the learning unit 66 estimates a probability distribution with respect to unobserved data. The learning unit 66 then calculates the conditional probability corresponding to the unobserved data by calculating the expected value with respect to the unobserved data, based on the probability distribution. With respect to the learning of the conditional probability, for example, the learning unit 66 can use the method described on "Outline of Bayesian Network", pages 35-38 and pages 85-87, written by Masao Shigemasu et al.

After CPTs with respect to each standard model are determined, the learning unit 66 calculates an information criterion with respect to each probabilistic model in order to evaluate the temporary probabilistic models (step S202).

In the present embodiment, AIC (Akaike Information Criterion) is used as the information criterion. AIC can be determined based on the following equation whose inputs are the maximum logarithm likelihood and the number of parameters of the probabilistic model.

$$AIC_m = -2l_m(\theta_m|X) + 2k_m$$

wherein $AIC_m$ is AIC of the probabilistic model M. $\theta_m$ is a set of parameters of the probabilistic model M, $l_m(\theta_m|X)$ is a value of the maximum logarithm likelihood of the data X in the probabilistic model M, and $k_m$ is number of parameters of the probabilistic model M. In this case, $l_m(\theta_m|X)$ can be calculated by the following procedure. First, the learning unit 66 calculates an appearance frequency corresponding to each combination of the segments of input parameters included in the learning information $D_{Ak}$, with respect to the parent nodes of each node. The learning unit 66 then calculates values obtained by multiplying each appearance frequency by a logarithmic value of the conditional probability. Finally, the learning unit 66 sums up the obtained values to determine $l_m(\theta_m|X)$. The value of $k_m$ can be determined by adding the number of combinations of the parameters with respect to the parent nodes of each node.

After the learning unit 66 determined the AICs with respect to all probabilistic models, the learning unit 66 selects the temporary probabilistic model corresponding to the lowest value of the AIC, as a probabilistic model to be used (i.e. the built probabilistic model) and stores the selected model in the storage unit 61 (step S203). Then, the learning unit 66 deletes other temporary probabilistic models (step S204).

In addition, with respect to the selection of the probabilistic model using the information criterion (in other words, the learning of the graph structure), the learning unit 66 may use other information criterion such as Bayesian Information Criterion (BIC), Takeuchi Information Criterion (TIC) and the minimum description length (MDL). Further, the learning unit 66 may use the information criterion which is obtained by inverting the sign of one of the above information criterions. In this case, the learning unit 66 selects the temporary probabilistic model corresponding to the highest value of the information criterion, as the built probabilistic model.

The learning unit 66 stores the built probabilistic model in the storage unit 61. Further, the learning unit 66 acquires a passenger's ID, which is related to the learning information $D_{Ak}$, and the setting operation number k, relates them with the built probabilistic model and stores them in the storage unit 61. Further, the learning unit 66 specifies the setting parameter to be modified using the probabilistic model and the modified value of the setting parameter, based on the setting operation number k, relates the setting parameter and the modified value to the probabilistic model and stores them in the storage unit 61. In this connection, a relationship between the setting operation number k, and the modified setting parameter and the modified value of the parameter is previously prescribed as a lookup table and is stored in the storage unit 61.

Referring to the flow charts shown in FIGS. 8A, 8B and 9, an air-conditioning operation of the air conditioner 1 according to the first embodiment of the present invention will be explained below. In this connection, the air-conditioning operation is performed by the controller 60 according to a computer program incorporated into the controller 60.

Figure 8A:
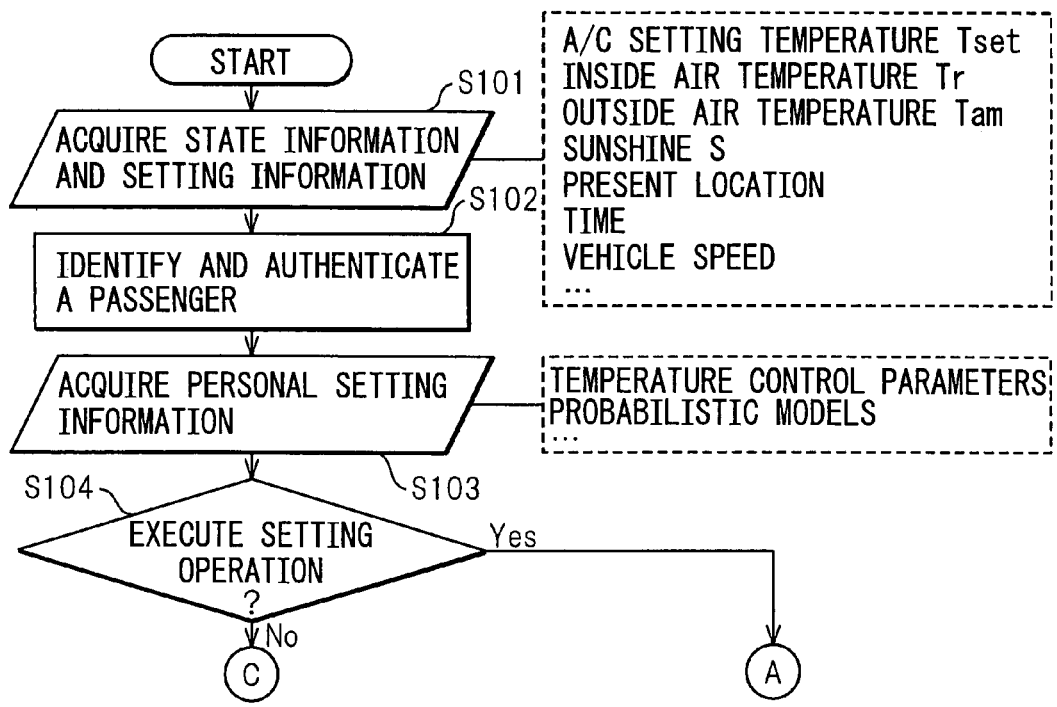
FIGS. 8A and 8B show flow chart for controlling of the air conditioner according to the first embodiment of the present invention.

First, as shown in FIG. 8A, when the engine switch is turned on, the controller 60 starts the air conditioner 1. Then, the controller 60 acquires state information from the sensors, the navigation system 56 and the vehicle operation device 57 via the communicating unit 62 (step S101). Similarly, the controller 60 acquires each setting information from the storage unit 61. Next, the identifying unit 63 of the controller 60 identifies and authenticates the passenger (step S102). Then, the controller 60 reads out personal setting information of the registered user identified as the passenger from the storage unit 61 (step S103).

Next, the controller 60 judges whether or not the passenger executed the setting operation of the air conditioner 1, in other words, the controller 60 judges whether or not any setting of the air conditioner 1 was changed (step S104). When the controller 60 receives an operation signal from A/C operation panel 59, it judges that the setting operation was executed.

Figure 8B:
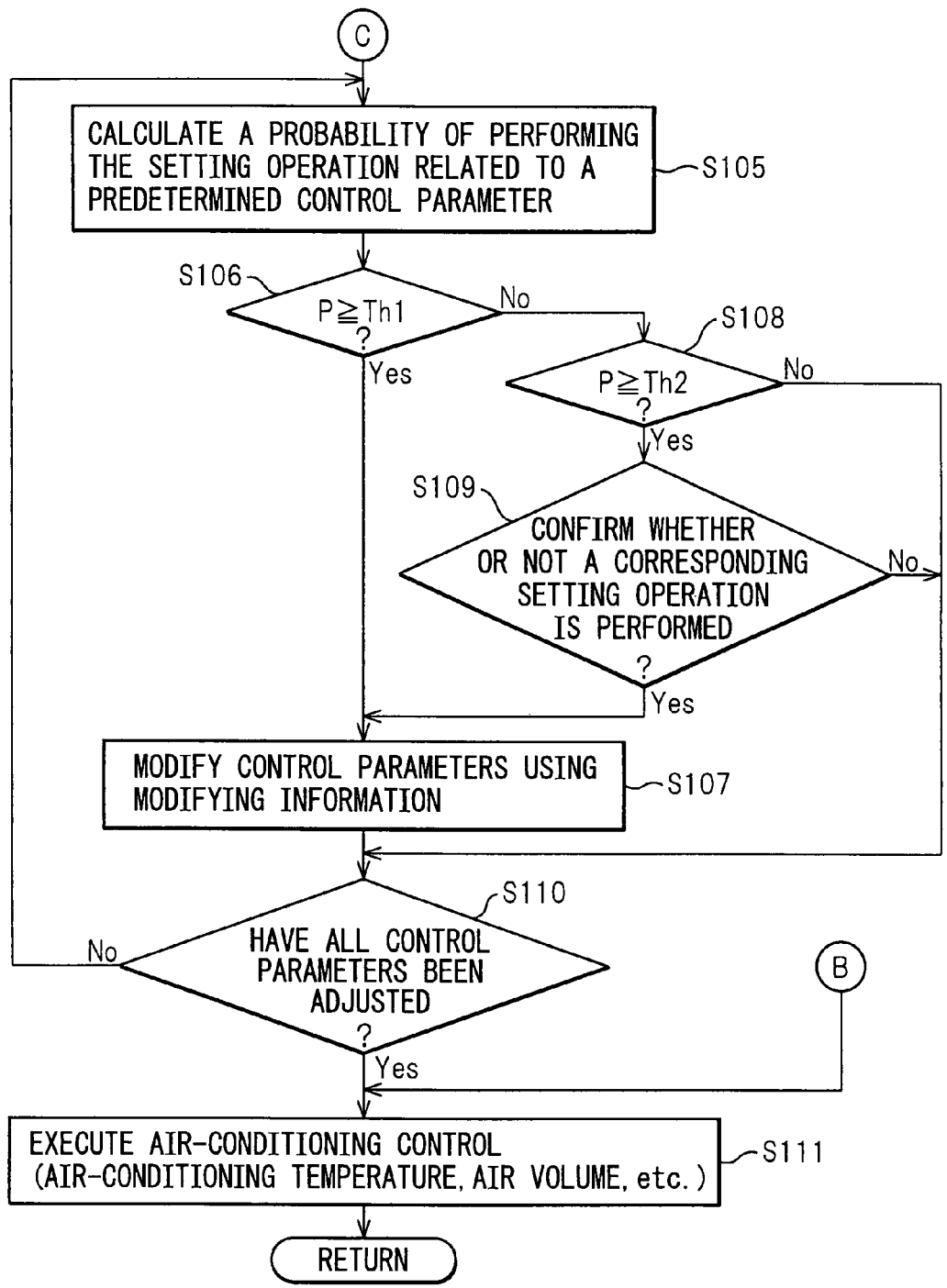

As shown in FIG. 8B, when the passenger was not executed the setting operation, the control information modifying unit 64 of the controller 60 inputs the observed state information into the probabilistic models which are related to the specific setting parameter (for example, the setting temperature $T_{set}$) with respect to one of setting operation groups, in all of the probabilistic models related to the passenger. The control information modifying unit 64 then calculates a probability of performing the setting operation related to the each probabilistic model (step S105). The control information modifying unit 64 determines the highest probability of the calculated probabilities with respect to the setting operation as a probability P of recommendation (an appearance probability).

Next, the control information modifying unit 64 compares the probability P with the first predetermined value $Th_1$ (step S106). When the probability P is not less than the first predetermined value $Th_1$ (for example, $Th_1=0.9$), the control information modifying unit 64 modifies the corresponding setting parameter of the air conditioner 1 based on the modifying information related to the probability model (i.e. the selected probability model) which has outputted the probability P (step S107). On the other hand, when the probability P is lower than the first predetermined value $Th_1$, the control information modifying unit 64 compares the probability P with the second predetermined value $Th_2$ (for example, $Th_2=0.6$) (step S108). When the probability P is not less than the second predetermined value $T_{h2}$, the control information modifying unit 64 displays the contents of the setting operation corresponding to the setting operation number k related to the selected probability model via the display unit such as A/C operation panel 59. Then, the control information modifying unit 64 confirms whether or not the setting operation is executed (step S109). When the passenger agrees to execute the setting operation, the control information modifying unit 64 modifies the setting parameter based on the modifying information related to the selected probabilistic model (step S107). On the other hand, when the passenger does not agree to execute the setting operation, the control information modifying unit 64 does not modify the setting parameter. In other words, the control information modifying unit 64 does not execute the setting operation related to the setting parameter related to the selected probabilistic model. Further, in step S108, when the probability P is lower than the second predetermined value $T_{h2}$, the control information modifying unit 64 does not modify the setting parameter.

After that, by judging whether or not the probabilities of all the probabilistic models have been calculated, the control information modifying unit 64 judges whether or not all the setting parameters have been adjusted (step S110). When the probabilities have not been calculated with respect to all the probabilistic models yet, in other words, the control information modifying unit 64 is not judged whether or not the setting information with respect to some setting operation groups is modified, the controller 60 returns the control to step S105. On the other hand, when the probabilities have been calculated with respect to all the probabilistic models, the air-conditioning control unit 65 of the controller 60 adjusts a degree of opening of the air mixing door, a rotating speed of the blower and a degree of opening of the door of each blowout port so that a desired air-conditioning temperature and air volume can be obtained based on the modified setting parameter, if necessary (step S111).

As shown in FIG. 9, when the passenger executes any setting operation of the air conditioner 1 in step S104 shown in FIG. 8A, the controller 60 specifies the executed setting operation by referring to the setting signal (step S112). The controller 60 relates the obtained state information to ID number of the passenger, the setting operation number k corresponding to the executed setting operation and the number $i_{Ak}$ of times of the executed setting operation and stores the obtained state information in the storage unit 61 as elements of the learning information $D_{Ak}$ (step S113).

After that, the learning unit 66 of the controller 60 judges whether or not the number $i_{Ak}$ of times is equal to the predetermined number n1*j(j=1, 2, 3) (step S114). For example, the predetermined number n1 is 10. When it is judged that $i_{Ak}=n1*j$, the learning unit 66 builds a probabilistic model $M_{Aqk}$ using the learning information $D_{Ak}$ which is stored in the storage unit 61 and related to the passenger and the setting operation number k (step S115). In this connection, the probabilistic model $M_{Aqk}$ is built according to the procedure shown in the flow chart of FIG. 7. The learning unit 66 being related the probabilistic model $M_{Aqk}$ to ID of the passenger and stores it in the storage unit 61. On the other hand, in step S114, the controller 60 shifts the control to step S116 when $i_{Ak}$ is not equal to n1*j.

Next, the learning unit 66 judges whether or not the number $i_{Ak}$ of times is equal to the predetermined number n2 (for example, n2=30) (step S116). When $i_{Ak}$ is not equal to n2, $i_{Ak}$ is increased by 1 (step S117) and controller 60 shifts the control to step S111 shown in FIG. 8B. On the other hand, when $i_{Ak}=n2$ in step S116, the learning unit 66 deletes the learning information $D_{Ak}$ which is related to the passenger and the setting operation number k, from the storage unit 61 (step S118). Further, $i_{Ak}$ is initialized so as to make $i_{Ak}$ to be zero, in other words, $i_{Ak}=0$. After that, the controller 60 shifts the control to step S111.

In step S114 in the above flow chart, in order for to judge whether or not the learning unit 66 builds the probabilistic model, instead of comparing the number $i_{Ak}$ of times with the predetermined number n1*j(j=1, 2, 3), the learning unit 66 may judge whether or not time as elapsed since the latest probabilistic model related to the specific setting operation was built, is longer than the first predetermined period of time (for example, a week or a month). In this case, when the elapsed time is longer than the first predetermined time, the learning unit 66 builds a probabilistic model related to the specific setting operation. In other words, the learning unit 66 executes process shown in steps S115 to S118. In this connection, the controller 60 stores the date and hour when the probabilistic model was built, in the storage unit 61 and relates the date and hour to the probabilistic model, in order to judge whether or not the probabilistic model is built on the basis of the elapsed time. At the time of calculating the elapsed time, the learning unit 66 acquires the date and hour which is related to the latest probabilistic model of the probabilistic models related to the setting operation, from the storage unit 61 and calculates a difference between the date and hour when the latest probabilistic model was built, and the present time. In this way, the elapsed time is calculated.

Further, when the learning unit 66 judges whether or not the probabilistic model is built based on the elapsed time, in the above step S116, the learning unit 66 may compare the elapsed time with the second predetermined time (for example, 4 weeks or 6 months) which is longer than the first predetermined time. When the elapsed time is longer than the second predetermined time, the learning unit 66 deletes the learning information $D_{Ak}$ and rewrites a value of the updating flag f.

After that, the air conditioner 1 repeats the control process of steps S101 to S118 until the air conditioner 1 stops.

As discussed above, the air conditioner according to the first embodiment of the present invention estimates an air-conditioning setting operation performed by a passenger based on at least one probabilistic model which was learned in accordance with the sensitivity to temperature of a passenger or specific circumstances. Therefore, the air conditioner can automatically optimize an air-conditioning setting in accordance with a passenger's sensitivity to temperature and the specific circumstances. When the passenger continues to use the air conditioner, a different probabilistic model corresponding to each specific circumstance can be separately generated. Accordingly, the air conditioner can optimize the air-conditioning setting corresponding to various circumstances.

Next, an air conditioner according to the second embodiment of the present invention will be explained below. The air conditioner according to the second embodiment of the present invention automatically determines whether temperature control corresponding to a passenger's sensitivity to the temperature of a passenger or air-conditioning setting corresponding to specific circumstances should be learned.

When the air conditioner according to the second embodiment of the present invention is compared with the air conditioner according to the first embodiment, the function of the learning unit 66 of the controller 60 of the air conditioner according to the second embodiment differs from that of the learning unit 66 of the air conditioner according to the first embodiment. However, the function of the other components and the constituent of the air conditioner according to the second embodiment are same as that of the air conditioner according to the first embodiment. Therefore, the learning unit 66 will be explained below and the details of the other components will be not explained hereafter. With respect to the constitution of the air conditioner, please refer to FIGS. 1 and 2 and the relating description.

In the second embodiment of the present invention, when a passenger operates the air conditioner 1, the learning unit 66 judges whether or not a new probabilistic model is generated or whether or not an existing probabilistic model is updated. If necessary, the probabilistic model is generated or updated. Further, if necessary, the learning unit 66 modifies the temperature control equation or the air volume control equation.

Therefore, the learning unit 66 judges whether or not the input parameters of the probabilistic model, which has been built according to the procedure described together with FIG. 7, contains the input parameters of the temperature control equation or the air volume control equation, in other words, whether or not the input parameters of the probabilistic model contains only air-conditioning information (inside air temperature $T_r$, outside air temperature $T_{am}$ and sunshine S). When the input parameter contains only the air-conditioning information, it is considered that the temperature control is not optimized with respect a passenger's sensitivity to temperature. Therefore, the learning unit 66 modifies the control equations. Which control equation is to be modified is decided based on the setting operation α. When the setting operation α is related to the air-conditioning temperature setting, the learning unit 66 modifies the temperature control equation. When the setting operation α is related to the air volume setting, the learning unit 66 modifies the air volume control equation.

On the other hand, when the input parameters contains information (for example, the time or the present location) which differ from the air-conditioning information, it appears that a probabilistic model for performing an air-conditioning setting corresponding to a specific circumstance has been built. Therefore, the learning unit 66 does not modify the control equations.

Next, modification of the control equations will be explained below.

As an example, when the temperature control equation is modified, the learning unit 66 establishes simultaneous equations whose variables are temperature control parameters $K_{set}$, $K_r$, $K_s$ and C, based on the learning information $D_{Ak}$, the setting temperature $T_{set}$ and the air-conditioning temperature $T_{ao}$ after setting operation was performed. The learning unit 66 can determine the modified temperature control parameters by solving the simultaneous equations. Alternatively, as described in Japanese unexamined patent publication No. 5-147421, based on the amount of modification $\Delta T_{set}$, which is a difference between the setting temperature $T_{set}$ and the modified setting temperature, and the distribution of the sunshine S when the setting operation was executed, the learning unit 66 may approximately indicate the amount of modification $\Delta T_{set}$ by the linear equation of the sunshine S and modify the temperature control parameter $K_s$ on the basis of the result of the approximation. Further, as described in Japanese unexamined patent publications No. 2000-293204, 2000-071060, 5-208610 and 5-169963, the learning unit 66 may modify the temperature control equation and the air volume control equation using other various well known methods. When the air volume is decided by the map control, the learning unit 66 can modify the map using the learning information $D_{Ak}$ according to the well-known method.

An air-conditioning control process of the air conditioner 1 according to the second embodiment of the present invention will be explained as follows. The air-conditioning control process is performed by the controller 60 according to a computer program incorporated into the controller 60. The learning process of the air-conditioning control process of the air conditioner 1 according to the second embodiment of the present invention differs from that shown in FIG. 9 of the air-conditioning control process of the air conditioner 1 according to the first embodiment. Therefore, the leaning process will be explained below. With respect to the other process of the control process, please refer to FIGS. 8A and 8B and the explanations of the control process of the air conditioner 1 according to the first embodiment of the present invention.

Figure 10:
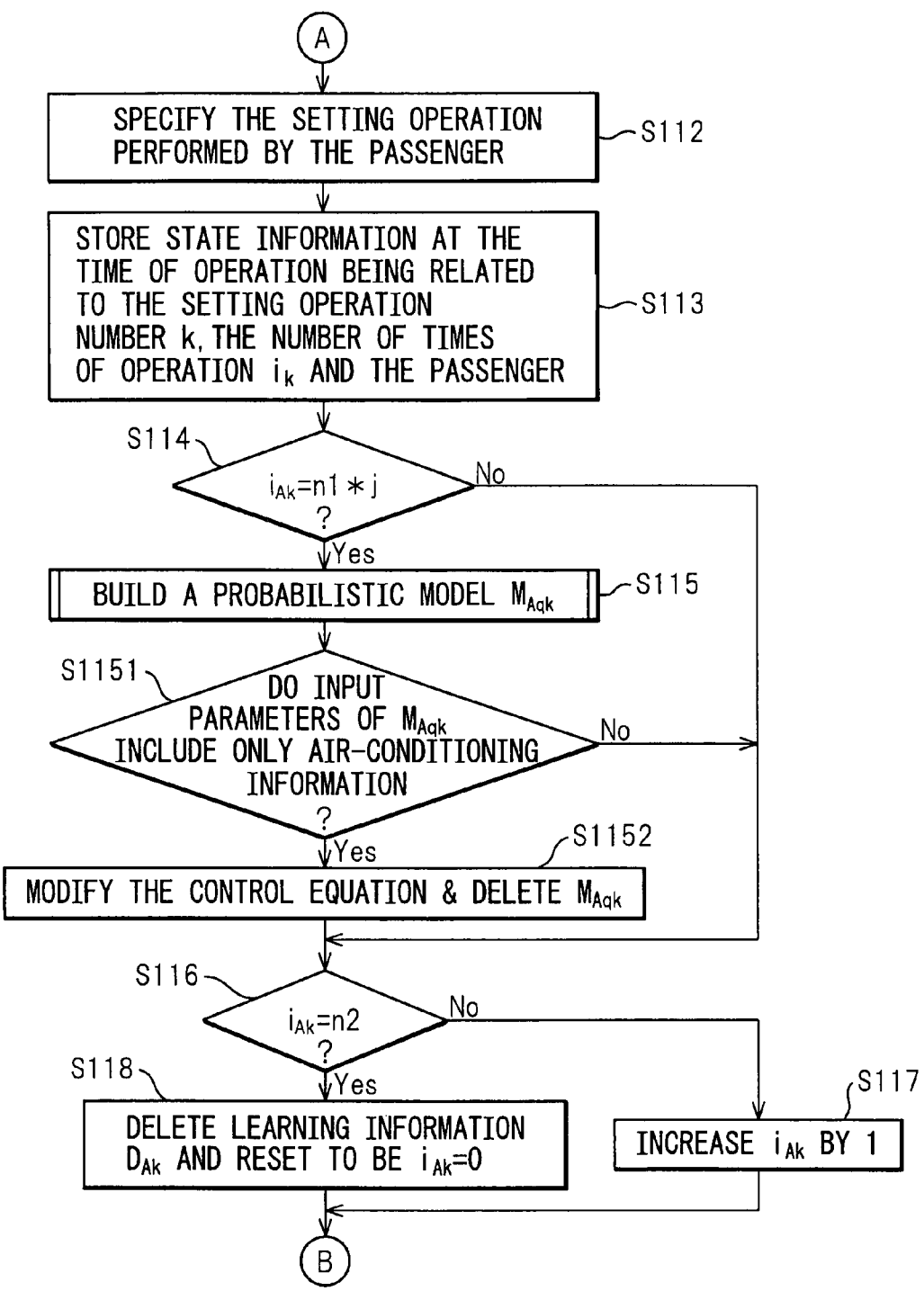
FIG. 10 shows a flow chart for controlling of an air conditioner according to the second embodiment of the present invention.

FIG. 10 shows a flow chart of the learning process of the air conditioner 1 according to the second embodiment of the present invention.

As shown in FIG. 10, in step S104 shown in FIG. 8A, when a passenger executes the setting operation of the air conditioner 1, the controller 60 specifies the executed setting operation by referring to the setting signal (step S112). The controller 60 relates the obtained state information to ID number of the passenger, the setting operation number k corresponding to the executed setting operation and the number $i_{Ak}$ of times of the executed setting operation and stores the obtained state information in the storage unit 61 as elements of the learning information $D_{Ak}$ (step S113).

After that, the learning unit 66 of the controller 60 judges whether or not the number $i_{Ak}$ of times is equal to the predetermined number n1*j(j=1, 2, 3) (step S114). For example, the predetermined number n1 is 10. When it is judged that $i_{Ak}$=n1*j, the learning unit 66 builds a probabilistic model $M_{Aqk}$ using the learning information $D_{Ak}$ which is stored in the storage unit 61 and related to the passenger and the setting operation number k (step S115). In this connection, the probabilistic model $M_{Aqk}$ is built according to the procedure shown in the flow chart of FIG. 7. The learning unit 66 being related the probabilistic model $M_{Aqk}$ to ID of the passenger and stores it in the storage unit 61. On the other hand, in step S114, the controller 60 shifts the control to step S116 when $i_{Ak}$ is not equal to n1*j.

Next, the learning unit 66 judges whether or not the input parameters of the probabilistic model $M_{Aqk}$ include a parameter which is independent of the air-conditioning information (the air-conditioning information includes the inside air temperature $T_r$, the outside air temperature $T_{am}$ and the sunshine S) (step S1151). When the input parameters of the probabilistic model $M_{Aqk}$ include only a parameter related to the air-conditioning information, the learning unit 66 judges that the temperature control is not optimized with respect to the passenger's sensitivity to temperature. The learning unit 66 then modifies the control equation related to the setting operation α (step S1152). For example, when the setting operation α changes the setting temperature, constants $K_{set}$, $K_r$, $K_{am}$, $K_s$ and C of the temperature control equation are corrected. Then, the probabilistic model $M_{Aqk}$ is discarded. On the other hand, when the input parameters of the probabilistic model $M_{Aqk}$ includes a parameter which is independent of the air-conditioning information, the learning unit 66 judges that the built probabilistic model $M_{Aqk}$ corresponds to a specific circumstance. As a result, the learning unit 66 does not modify the control equation related to the setting operation a and shifts the control to step S116.

Next, the learning unit 66 judges whether or not the number $i_{Ak}$ of times is equal to the predetermined number n2 (for example, n2=30) (step S116). When $i_{Ak}$ is not equal to n2, $i_{Ak}$ is increased by 1 (step S117) and controller 60 shifts the control to step S111 shown in FIG. 8B. On the other hand, when $i_{Ak}$=n2 in step S116, the learning unit 66 deletes the learning information $D_{Ak}$ which is related to the passenger and the setting operation number k, from the storage unit 61 (step S118). Further, $i_{Ak}$ is initialized so as to reset $i_{Ak}$, in other words, $i_{Ak}$=0. After that, the controller 60 shifts the control to step S111.

After that, the air conditioner 1 repeats the control process of steps S101 to S118 until the air conditioner 1 stops. In this connection, in the above steps S114 and S116, in the same manner as that of the first embodiment, instead of judging whether or not learning is performed by comparing the number of times with the predetermined number, the controller 60 may decide whether or not the learning is executed by judging whether or not the elapsed time is longer than a predetermined period of time.

As explained above, The air conditioner according to the second embodiment of the present invention automatically determines whether temperature control corresponding to a passenger's sensitivity to temperature or air-conditioning setting corresponding to specific circumstances should be learned. Therefore, the air conditioner can automatically optimize the air-conditioning setting in accordance with the passenger's sensitivity to temperature. Further, the air conditioner can also automatically optimize the air-conditioning setting according to the specific circumstances.

Next, an air conditioner according to the third embodiment of the present invention will be explained below. In the air conditioner according to the third embodiment of the present invention, the learning unit and the storage unit of the air conditioner according to the first and the second embodiment are arranged in a server provided separately from the vehicle and the probabilistic model or the control equation such as a temperature control equation is learned by the server.

Figure 11:
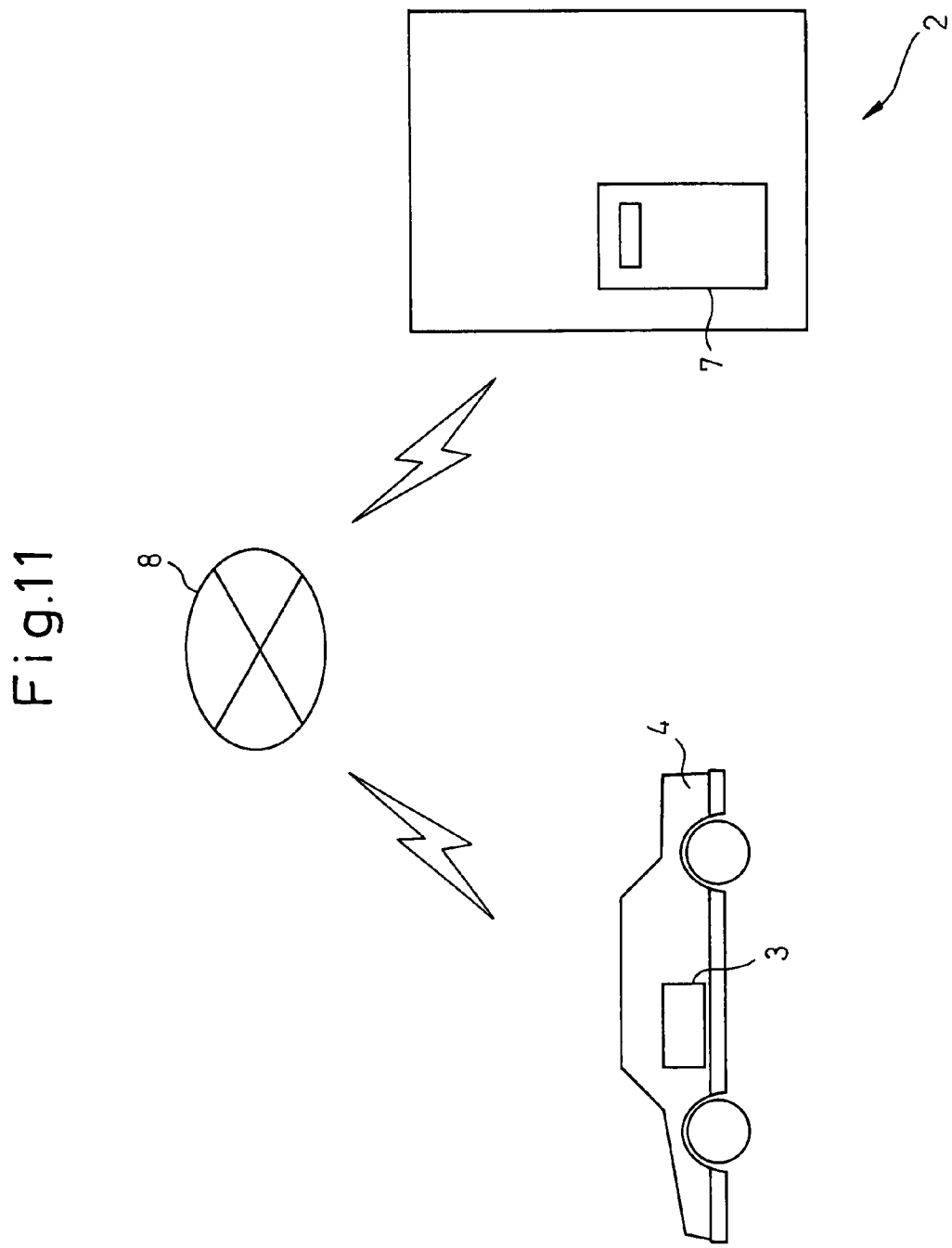
FIG. 11 is an overall arrangement view showing an air conditioner according to the third embodiment of the present invention.

FIG. 11 shows a system structure of the air conditioner 2 according to the third embodiment of the present invention. The air conditioner 2 according to the third embodiment of the present invention includes an air conditioner body 3 mounted on the vehicle 4 and a server 7 arranged in a service center. The air conditioner body 3 can transmit data to the server 7 and receive data from the server 7 through the wireless communication network 8 such as a mobile phone network.

Figure 12:
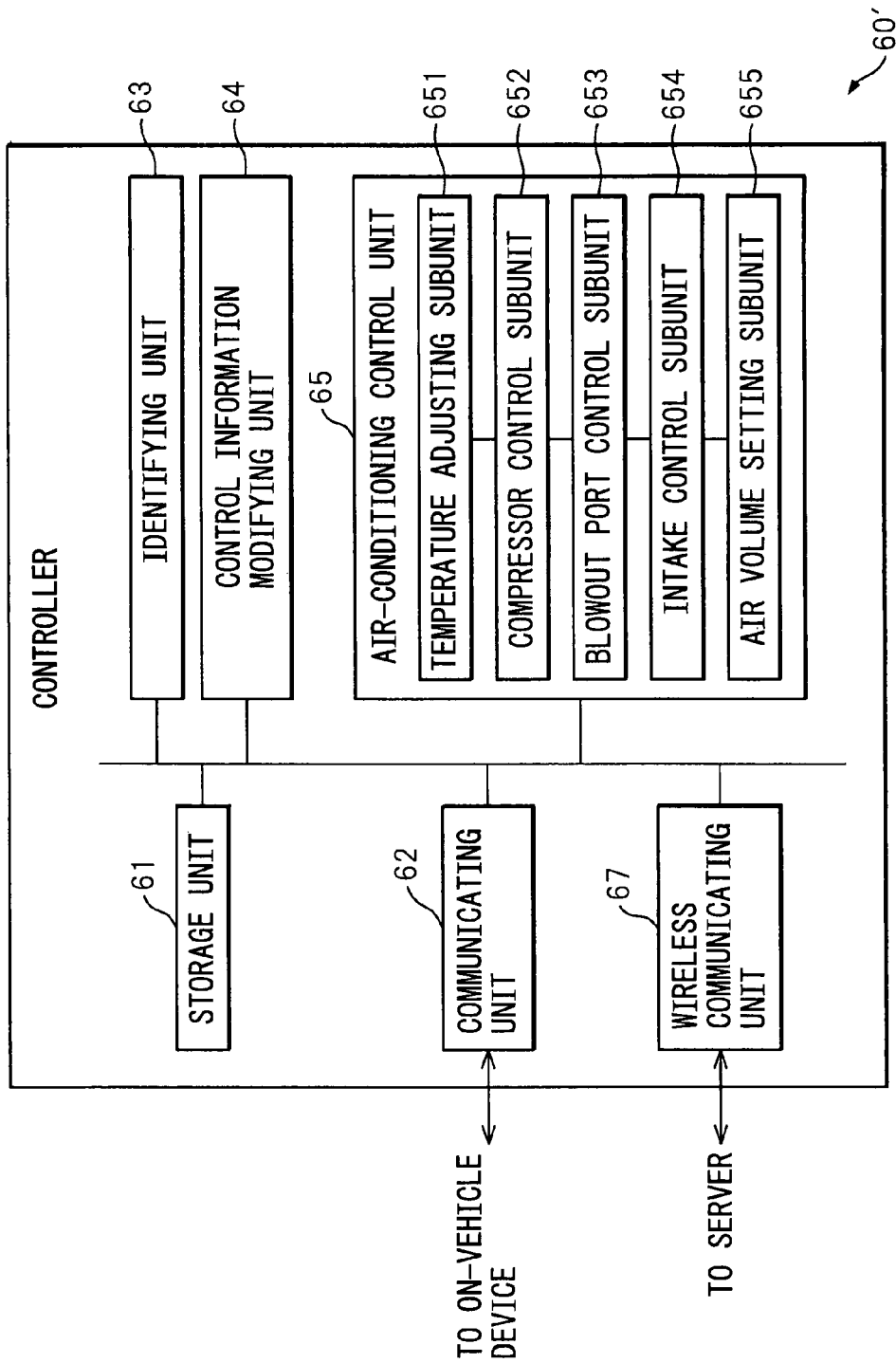
FIG. 12 is a functional block diagram showing a controller of the air conditioner according to third embodiment of the present invention.

FIG. 12 is a functional block diagram of the controller 60' of the air conditioner body 3. Comparing the controller 60' with the controller 60 of the air conditioner 1 according to the first embodiment, it will be understood that the controller 60' does not have the learning unit 66, but has the wireless communicating unit 67. In this connection, the other unit of the controller 60' such as the control information modifying unit 64 and the air-conditioning control unit 65 are the same as that of controller 60 of the air conditioner 1 according to the first embodiment. The other components of the air conditioner body 3 except for the controller 60' such as the air-conditioning unit 10 and A/C operation panel 59 are also same as that of the air conditioner 1 according to the first embodiment. Therefore, the details of the other units of controller 60' and the other components of the air conditioner body 3 will be not explained hereafter.

The wireless communicating unit 67 includes a wireless communication interface for transmitting and receiving data through a wireless communication network 8 according to a predetermined protocol, a control circuit and a control program for controlling the wireless communication interface. The wireless communicating unit 67 transmits the learning information $D_{Ak}$ and the setting operation number to the server 7 together with ID of the passenger and ID of the vehicle for uniquely identifying the vehicle on which the air conditioner body 3 is mounted from the other vehicle. The ID of the passenger and the ID of the vehicle are previously determined according to a predefined rule. For example, the ID of the passenger and the ID of the vehicle are expressed by numbers of ten figures which are uniquely decided for each passenger and each vehicle. The wireless communicating unit 67 receives a newly built probabilistic model or a updated probabilistic model from the server 7. The received probabilistic model is stored in the storage unit 61 together with the information related to the above probabilistic model (the structural information of the probabilistic model, the identification number (ID) of the passenger, the setting operation number k, the setting parameter modified by the setting operation and the modified value of the setting parameter) so that it can be used in the control information modifying unit 64. Alternatively, the wireless communicating unit 67 may receive the temperature control parameters (for example, $K_{set}$, $K_r$, $K_{am}$, $K_s$), which are used in the temperature control equation, from the server 7.

Figure 13:
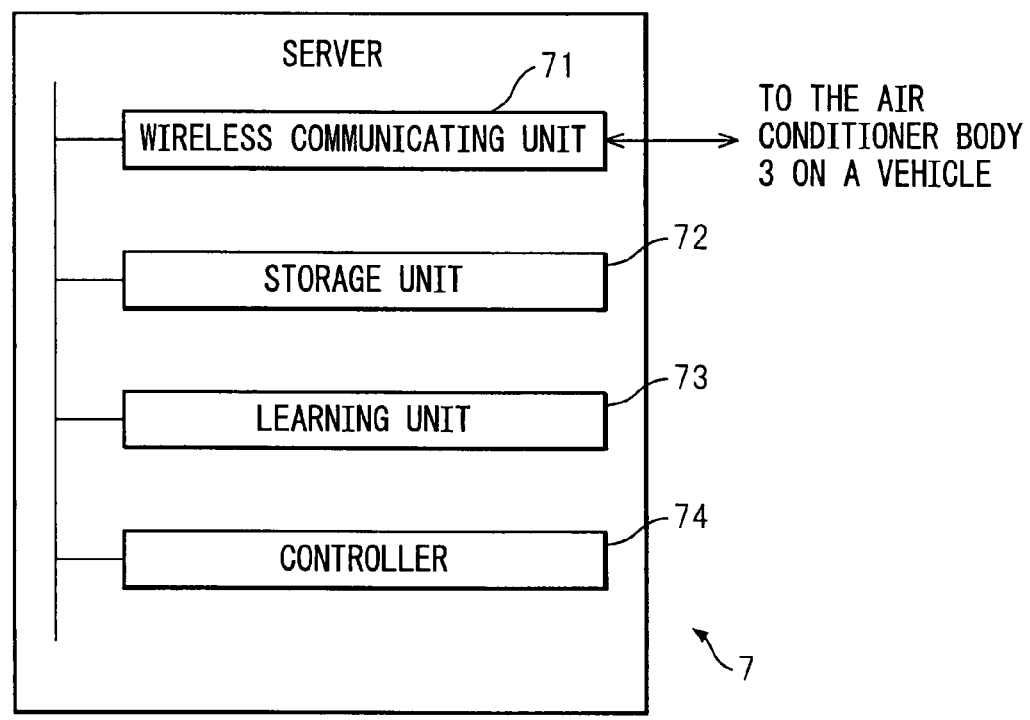
FIG. 13 is a functional block diagram of a server of the air conditioner according to third embodiment of the present invention.

FIG. 13 is a functional block diagram of the server 7. The server 7 is composed of a so-called data storage server or PC. The server 7 includes a wireless communicating unit 71 having a communication interface for performing wireless communication so that data can be transmitted and received through the wireless communication network 8 according to a predetermined communication protocol, and the control circuit and the control program for controlling the communication interface, a storage unit 72 having a semiconductor memory such as RAM, a magnetic disk or an optical disk and a read/write device for reading/writing the disk, a learning unit 73 implemented on a processor such as CPU, and a controller 74. Each unit of the server 7 is controlled by the controller 74.

The wireless communicating unit 71 transmits data to the air conditioner body 3 and receives data from the air conditioner body 3 through the wireless communication network 8. Specifically, the wireless communicating unit 71 receives the learning information $D_{Ak}$, the setting operation number k, passenger ID and vehicle ID from the air conditioner body 3. The wireless communicating unit 71 transmits the probabilistic model, which was generated or updated by the learning unit 73, or the temperature control parameters, which are used for the temperature control equation, to the air conditioner body 3. In this connection, a destination of transmission is specified by referring to vehicle ID.

The storage unit 72 stores the learning information $D_{Ak}$, which was received from the air conditioner body 3, being related to the setting operation number k, passenger ID and vehicle ID. The storage unit 72 stores all of the probabilistic models and the temperature control parameters which the air conditioner body 3 can use.

The learning unit 73 generates and updates the probabilistic model based on the learning information $D_{Ak}$ stored the storage unit 72. Further, the learning unit 73 may modifies the temperature control parameters. In this connection, process performed by the learning unit 73 is the same as process performed by the learning unit 66 according the first or the second embodiment. Further, the learning unit 73 builds the probabilistic model according to the flow chart shown in FIG. 7. Therefore, the details of the process performed by the learning unit 73 will not be explained hereafter. In this connection, each time the learning unit 73 generates a new probabilistic model or updates an existing probabilistic model, the server 7 transmits the probabilistic model to the air conditioner body 3 through the wireless communicating unit 71 and stores the probabilistic model in the storage unit 72 as a backup data. In the same manner, when the temperature control parameters is modified, the server 7 transmit the parameters to the air conditioner body 3 and may store the parameters as a backup data in the storage unit 72.

Next, control process of the air conditioner 2 according to the third embodiment of the present invention will be explained below. The learning process of the air-conditioning control process of the air conditioner 1 according to the third embodiment of the present invention differs from that shown in FIG. 9 of the air-conditioning control process of the air conditioner 1 according to the first embodiment. Therefore, the leaning process will be explained below. With respect to the other process of the control process, please refer to FIGS. 8A and 8B and the explanations of the control process of the air conditioner 1 according to the first embodiment of the present invention.

FIG. 14 shows a flow chart of the learning process of the air conditioner 2.

As shown in FIG. 14, in step S104 shown in FIG. 8A, when a passenger executes the setting operation of the air conditioner body 3, in other words, when the passenger changes a setting of the air conditioner body 3, the controller 60' specifies the executed setting operation by referring to the setting signal (step S121). Then, The controller 60' relates the obtained state information to ID number of the passenger, the setting operation number k corresponding to the executed setting operation and the number $i_{Ak}$ of times of the executed setting operation and temporarily stores the obtained state information in the storage unit 61 as elements of the learning information $D_{Ak}$ (step S122).

After that, the controller 60' of the air conditioner body 3 judges whether or not the number $i_{Ak}$ of times of operation is equal to the predetermined number n1*j(j=1, 2, 3) (step S123). For example, the predetermined number n1 is 10. When it is judged that $i_{Ak}$=n1*j, the controller 60' transmits the learning information $D_{Ak}$, which is stored in the storage unit 61 and related to the passenger and the setting operation number k, to the server 7 together with passenger ID and vehicle ID (step S124). When the server 7 receives data such as the learning information $D_{Ak}$, the server 7 stores the data in the storage unit 72 and builds the probabilistic model $M_{Aqk}$ (step S125). In this connection, the probabilistic model $M_{Aqk}$ is built according to the procedure shown in the flow chart of FIG. 7. The server 7 stores the probabilistic model $M_{Aqk}$ in the storage unit 72 and relates the probabilistic model $M_{Aqk}$ to ID of the passenger. After that, the server 7 returns the built probabilistic model $M_{Aqk}$ to the air conditioner body 3, which transmitted the learning information $D_{Ak}$, by referring to ID of the vehicle (step S126). On the other hand, in step S123, when $i_{Ak}$ is not equal to n1*j, the controller 60' shifts the control to step S127.

Next, the controller 60' judges whether or not the number $i_{Ak}$ of times of operation is equal to the predetermined number n2 (for example, n2=30) (step S127). When $i_{Ak}$ is not equal to n2, $i_{Ak}$ is increased by 1 (step S128) and the controller 60' shifts the control to step S111 shown in FIG. 8B. On the other hand, in step S127, when $i_{Ak}$=n2, the controller 60' transmits a command to delete the learning information $D_{Ak}$ to the server 7 together with passenger ID, vehicle ID and the setting operation number k. When the server receives the command, the server 7 deletes the learning information $D_{Ak}$, which is stored in the storage unit 72 and related to passenger ID, vehicle ID and the setting operation number k (step S129). The controller 60' initializes $i_{Ak}$ so as to reset $i_{Ak}$, in other words, $i_{Ak}$=0. After that, the controller 60' shifts the control to step S111 shown in FIG. 8B. Then, the controller 60' finishes the learning process. In this connection, in the above steps S123 and S127, in the same manner as that of the first embodiment, instead of judging whether or not learning is performed by comparing the number of times with the predetermined number, the controller 60' may decide whether or not the learning is executed by judging whether or not the elapsed time is longer than a predetermined period of time.

In the embodiment described above, in step S124, the pieces of learning information corresponding to a plurality of times of setting operation are transmitted to the server 7 at the same time. However, the present invention is not limited to the above specific embodiment. For example, the controller 60' may transmit the learning information to the server 7 each time when the passenger executes the setting operation via A/C operation panel 59. Alternatively, the controller 60' may transmit the learning information to the server 7 each time when the number of executed setting operation reaches predetermined constant number (ex. 3 or 5) which is smaller than the predetermined number n1. In this case, the controller 60' can reduce an amount of data to be transmitted at once. Further, the controller 60' may transmit the learning information, which has been accumulated in a predetermined period of time (example, one week or one month), to the server 7 each time when the predetermined period of time passes.

In the above embodiment, the number $i_{Ak}$ of times is managed by the controller 60' of the air conditioner body 3. However, this number $i_{Ak}$ of times may be managed by the controller 74 of the server 7 and the controller 74 may execute the process of steps S123, S127-S129. In this case, in order for the controller 74 of the server 7 to accurately count the number $i_{Ak}$ of times of operation, the controller 60' transmits the setting operation number k, passenger ID and vehicle ID to the server 7 each time when the setting operation is executed via A/C operation panel 59. Further, in the present embodiment, it is unnecessary to mount the storage unit on the vehicle. Therefore, a magnetic disk of a large capacity can be used for the storage unit 72. In this case, instead of deleting the learning information in step S129, the server 7 may set up a flag in the learning information so as to indicate that the learning information is not used for building a probabilistic model. When the learning information is stored, the server 7 can use this learning information as the reference information when the probabilistic model is modified.

As described above, in the air conditioner according to the third embodiment of the present invention, the learning process, in which required amounts of calculation are relatively large, is executed by the server arranged separately from the vehicle. Accordingly, in the air conditioner described above, it is possible to reduce a load of calculation performed in the air conditioner body mounted on the vehicle. Since the learning information and the probabilistic models are stored in the server, for example, even if a user buys a new car, by relating the learning information and the probabilistic models to ID of the new car, it is possible to utilize the probabilistic models in the air conditioner mounted on the new car. Accordingly, it is not necessary for the user to newly perform learning. Therefore, the air conditioner mounted on the new car can recommend the most appropriate air-conditioning setting according to the specific circumstances.

In addition, the present invention is not limited to the above specific embodiment. For example, the passenger may be either a passenger or driver. By identifying a passenger that performed a setting operation of the air conditioner, even if a fellow passenger can operates the air conditioner, the present invention can be appropriately applied. For example, the air conditioner has two A/C operation panels 59 one of the panels is used for driver and the other panel is used for assistant driver. In this case, the controller 60/60' may judge whether the driver or the fellow passenger performed the setting operation by detecting A/C operation panel 59 which was operated. As described in Japanese unexamined patent publication No. 2002-29239, the controller 60/60' may judge whether the driver or the fellow passenger operated, using an operating passenger detection sensor, which is composed of an infrared ray temperature sensor and arranged on A/C control panel 59.

When the fellow passenger performed the setting operation, in the same manner in which the driver is identified and authenticated, the controller 60/60' identifies and authenticates the fellow passenger as any registered user on the basis of the image data acquired by the in-vehicle camera 54. The controller 60/60' stores the state information such as a sensor value when the operation was performed as learning information and relates the state information to the fellow passenger rather than the driver.

When the passenger is limited to a specific person or when a probabilistic model is built with respect to the setting operation which may be performed by everyone that operates the air conditioner, the identifying unit 63 may be omitted. In this case, the probabilistic model is commonly used for every passenger. The learning information which is used for learning the probabilistic model is also commonly used for every passenger.

The state information which is used for building a probabilistic model and setting operation using the probabilistic model, may include setting information (ex. a setting temperature and an air volume) of the air conditioner when the state information is acquired.

Further, in the above embodiment, the parameters which are modified by the control information modifying unit 64, are parameters such as a setting temperature and an air volume, related to the setting information which the passenger can directly set via A/C operation panel 59. However, using the probabilistic model, the control information modifying unit 64 may modify parameters related to the control information for controlling the each unit of the air-conditioning unit 10, such as an air-conditioning temperature $T_{ao}$ calculated using the temperature control equation, a rotating speed of the blower 21 calculated using the air volume control equation or a degree of opening of the air mixing door 28.

In addition, the present invention can be widely applied to the air conditioner which is automatically controlled based on the state information which is not directly related to the air-conditioning operation. For example, when the controller 60 of the air conditioner 1 receives a signal indicating that the wipers are operating, the controller 60 may instruct the defroster to also operate. Further, when the controller 60 receives a signal indicating that the cigarette lighter is being used, the controller 60 may set an outside air mode. When the controller 60 receives a signal indicating that the car audio unit is turned on, the controller 60 may automatically reduce air volume. Further, the controller may automatically modify parameters which are not directly related to the control of the air conditioner. For example, when air volume is set to 0, the controller may open a window. In this case, a control signal is transmitted from the controller 60 to the control device of the vehicle.

In the above embodiment, in order to build a probabilistic model, standard models whose graph structure are previously prescribed, are provided. However, instead of using the standard models, the learning units 66/73 may search a graph structure of the probabilistic model using a K2 algorithm or a genetic algorithm. For example, in the case of using the genetic algorithm, a plurality of "genes" of which each element indicates whether the presence or absence of a connection between each node is provided. The learning units 66/73 calculate a fitness of each gene using an information criterion. After that, the learning units 66/73 selects genes whose fitness is not less than a predetermined value, and executes operations such as "cross over" or "mutation" in order to generate genes of the next generation. The learning units 66/73 repeats this procedure by a plurality of times and then selects the gene which corresponds to the highest fitness, from every genes. The learning units 66/73 uses a graph structure, which is described by the selected gene, in order to build a probabilistic model. Further, the learning units 66/73 may use a combination of an algorithm such as the K2 algorithm or genetic algorithm and the algorithm for building of a probabilistic model using the standard models.

In the above embodiment, Bayesian Network is used as a probabilistic model. However, for example, another probabilistic model such as Hidden Markov model may be used.

In the above embodiment, when the passenger operates the air conditioner 1, various information is accumulated for learning the probabilistic model. However, the learning units 66/73 may accumulate not only information acquired when the passenger performed a setting operation, but also historical information and information periodically acquired (for example, every 10 minutes) to use the information for the learning.

In addition, an air conditioner according to the present invention may be any type of a front single type, a right and left independent type, a rear independent type, a 4-seat independent type and an upper and lower independent type of an air conditioner. When the present invention is applied to an independent type air conditioner, a plurality of inside air temperature sensors and sunshine sensors may be provided.

As described above, variations can be made without departing from the scope of the present invention.

What is claimed is:

1. An air conditioner for a vehicle comprising:
   an air-conditioning unit for supplying conditioned air into a vehicle;
   an information acquiring unit for acquiring state information indicating a state of the vehicle;
   a control information modifying unit having at least one probabilistic model for calculating a probability that a passenger will perform a predetermined setting operation, calculating said probability by inputting the state information into the at least one probabilistic model, and modifying the setting information or the control information related to the setting operation of the passenger according to the calculated probability so that the predetermined setting operation is performed;

an air-conditioning control unit for controlling the air-conditioning unit according to the modified setting information or control information;

an operating unit for performing a setting operation of the air conditioner;

a storage unit for storing the state information acquired by the information acquiring unit and relating the state information to the predetermined setting operation, each time when the predetermined setting operation is performed via the operating unit; and a learning unit for building a first probabilistic model for calculating said probability of performing the predetermined setting operation using the state information which is stored in the storage unit and related to the predetermined setting operation; wherein the learning unit builds temporary probabilistic models by deciding a graph structure of each temporary probability model and a conditional probability relating to each node included in the graph structure using the state information which is stored in the storage unit and related to the predetermined setting operation, and selects the most appropriate temporary probabilistic model from the temporary probabilistic models according to a predetermined criterion as the first probabilistic model.

2. The air conditioner according to claim 1, wherein the control information modifying unit modifies the setting information or the control information when said probability is not less than a first threshold value.

3. The air conditioner according to claim 2, further comprising a confirmation operating unit for informing a passenger of a content of the predetermined setting operation and confirming the passenger whether or not the predetermined setting operation is performed when said probability is lower than the first threshold value and not less than a second threshold value which is lower than the first threshold value, wherein the control information modifying unit modifies the setting information or the control information when it is confirmed via the confirmation operating unit that the predetermined setting operation is performed.

4. The air conditioner according to claim 1, wherein the control information modifying unit has a plurality of probabilistic models related to the predetermined control information, calculates the probabilities of performing the predetermined setting operation based on the plurality of probabilistic models and determines the highest probability of said probabilities as said probability.

5. The air conditioner according to claim 1, further comprising:

a passenger information acquiring unit for acquiring passenger information; and a identifying unit for matching the passenger with at least one registered user that was previously stored using the passenger information, wherein the control information modifying unit calculates said probability based on a probabilistic model related to the registered user that was identified as the passenger by the identifying unit.

6. The air conditioner according to claim 1, wherein the predetermined criterion is an information criterion and the learning unit decides a temporary probabilistic model corresponding to the maximum value or the minimum value of the calculated information criterion with respect to each of the temporary probabilistic models as the first probabilistic model.

7. An air conditioner for a vehicle comprising:

an air-conditioning unit for supplying conditioned air into a vehicle;

an information acquiring unit for acquiring state information indicating a state of the vehicle;

a control information modifying unit having at least one probabilistic model for calculating a probability that a passenger will perform a predetermined setting operation, calculating said probability by inputting the state information into the at least one probabilistic model, and modifying the setting information or the control information related to the setting operation of the passenger according to the calculated probability so that the predetermined setting operation is performed;

an air-conditioning control unit for controlling the air-conditioning unit according to the modified setting information or control information;

an operating unit for performing a setting operation of the air conditioner;

a storage unit for storing the state information acquired by the information acquiring unit and relating the state information to the predetermined setting operation, each time when the predetermined setting operation is performed via the operating unit; and a learning unit for building a first probabilistic model for calculating said probability of performing the predetermined setting operation using the state information which is stored in the storage unit and related to the predetermined setting operation; wherein the learning unit has a plurality of standard models having a predetermined graph structure, and the learning unit builds temporary probabilistic models by deciding a conditional probability relating to each node included in the predetermined graph structure using the state information which is stored in the storage unit and related to the predetermined setting operation, and selects the most appropriate temporary probabilistic model from the temporary probabilistic models according to a predetermined criterion as the first probabilistic model.

8. The air conditioner according to claim 7, wherein the predetermined criterion is an information criterion and the learning unit decides a temporary probabilistic model corresponding to the maximum value or the minimum value of the calculated information criterion with respect to each of the temporary probabilistic models as the first probabilistic model.

9. An air conditioner for a vehicle comprising:

an air-conditioning unit for supplying conditioned air into a vehicle;

an information acquiring unit for acquiring state information indicating a state of the vehicle;

a control information modifying unit having at least one probabilistic model for calculating a probability that a passenger will perform a predetermined setting operation, calculating said probability by inputting the state information into the at least one probabilistic, model, and modifying the setting information or the control information related to the setting operation of the passenger according to the calculated probability so that the predetermined setting operation is performed;

an air-conditioning control unit for controlling the air-conditioning unit according to the modified setting information or control information;

an operating unit for performing a setting operation of the air conditioner;

a storage unit for storing the state information acquired by the information acquiring unit and relating the state information to the predetermined setting operation, each time when the predetermined setting operation is performed via the operating unit; and a learning unit for building a first probabilistic model for calculating said probability of performing the predetermined setting operation using the state information which is stored in the storage unit and related to the predetermined setting operation; wherein the learning unit builds the first probabilistic model when the number of times of performing the predetermined setting operation is not less than a first predetermined number.

10. The air conditioner according to claim 9, wherein the learning unit deletes the state information, which is stored and related to the predetermined setting operation, from the storage unit and initializes the number of times, when the number of times of performing the predetermined setting operation is a second predetermined number, and builds a second probabilistic model for calculating said probability of performing the predetermined setting operation using the state information which is acquired each time when the predetermined setting operation is performed, stored in the storage unit and related to the predetermined setting operation, when the number of times of performing the predetermined setting operation reaches the first predetermined number after the number of times reached the second predetermined number.

11. The air conditioner according to claim 9, further comprising:

a passenger information acquiring unit for acquiring passenger information; and identifying unit for matching the passenger with at least one registered user that was previously stored using the passenger information, wherein the storage unit relates the state information to the registered user which was identified as the passenger by the identifying unit and stores the state information; and wherein the learning unit counts separately the number of times for each registered user, and when the number of times counted with respect to anyone of the registered users is not less than the first predetermined number, builds the first probabilistic model using the state information related to the registered user.

12. An air conditioner for a vehicle comprising:

an air-conditioning unit for supplying conditioned air into a vehicle;

an information acquiring unit for acquiring state information indicating a state of the vehicle;

a control information modifying unit having at least one probabilistic model for calculating a probability that a passenger will perform a predetermined setting operation, calculating said probability by inputting the state information into the at least one probabilistic model, and modifying the setting information or the control information related to the setting operation of the passenger according to the calculated probability so that the predetermined setting operation is performed;

an air-conditioning control unit for controlling the air-conditioning unit according to the modified setting information or control information;

a server arranged outside the vehicle;

an operating unit for performing a setting operation of the air conditioner; and a first communicating unit mounted on the vehicle, for performing a wireless communication with the server to transmit the state information which is acquired by the information acquiring unit when the predetermined setting operation is performed, together with the setting operation information indicating the predetermined setting operation to the server each time when a predetermined period of time passes, each time when the predetermined setting operation is performed via the operating unit, or each time when number of times of performing the predetermined setting operation is not less than a predetermined number, wherein the server comprising:

a storage unit for storing the state information acquired by the information acquiring unit when the predetermined setting operation is performed and relating the state information to the predetermined setting operation, based on the setting operation information;

a learning unit for building a first probabilistic model for calculating said probability of performing the predetermined setting operation using the state information which is stored in the storage unit and related to the predetermined setting operation; and a second communicating unit for performing a wireless communication with the vehicle to transmit the first probabilistic model to the vehicle so that the control information modifying unit use the first probabilistic model.

13. The air conditioner according to claim 12, wherein the learning unit builds temporary probabilistic models by deciding a graph structure of each temporary probability model and a conditional probability relating to each node including in the graph structure using the state information which is stored in the storage unit and related to the predetermined setting operation, and selects the most appropriate temporary probabilistic model from the temporary probabilistic models according to a predetermined criterion as the first probabilistic model.

14. The air conditioner according to claim 13, wherein the predetermined criterion is an information criterion and the learning unit decides a temporary probabilistic model corresponding to the maximum value or the minimum value of the calculated information criterion with respect to each of the temporary probabilistic models as the first probabilistic model.

15. The air conditioner according to claim 12, wherein the learning unit has a plurality of standard models having a predetermined graph structure, and the learning unit builds temporary probabilistic models by deciding a conditional probability relating to each node included in the predetermined graph structure using the state information which is stored in the storage unit and related to the predetermined setting operation, and selects the most appropriate temporary probabilistic model from the temporary probabilistic models according to a predetermined criterion as the first probabilistic model.

16. The air conditioner according to claim 15, wherein the predetermined criterion is an information criterion and the learning unit decides a temporary probabilistic model corresponding to the maximum value or the minimum value of the calculated information criterion with respect to each of the temporary probabilistic models as the first probabilistic model.

17. The air conditioner according to claim 12, wherein the learning unit builds the first probabilistic model when the number of times of performing the predetermined setting operation is not less than the first predetermined number.

18. The air conditioner according to claim 17, wherein the learning unit deletes the state information, which is stored and related to the predetermined setting operation, from the storage unit and initializes the number of times, when the number of times of performing the predetermined setting operation is the second predetermined number, and builds a second probabilistic model for calculating said probability of performing the predetermined setting operation using the state information which is acquired each time when the predetermined setting operation is performed, stored in the storage unit and related to the predetermined setting operation, when the number of times of performing the predetermined setting operation reaches the first predetermined number after the number of times reaches the second predetermined number.

19. The air conditioner according to claim 17, further comprising:
a passenger information acquiring unit for acquiring passenger information; and
a identifying unit for matching the passenger with at least one registered user that was previously stored using the passenger information, wherein
the first communicating unit transmits identification information of the registered user which was identified as the passenger by the identifying unit to the server together with the state information and the setting operation information;
wherein the storage unit relates the state information to the registered user based on the identification information and stores the state information; and
wherein the learning unit counts separately the number of times for each registered user, and when the number of times counted with respect to anyone of the registered users is not less than the first predetermined number, builds the first probabilistic model using the state information related to the registered user.

20. A method for controlling an air conditioner for a vehicle having an air-conditioning unit for supplying conditioned air into the vehicle, comprising:
acquiring state information indicating a state of the vehicle;
calculating a probability that a passenger will perform a predetermined setting operation, by inputting the state information into at least one probabilistic model for calculating said probability;
modifying setting information or control information related to the setting operation of the passenger according to said probability so that the predetermined setting operation is performed, when said probability satisfies a predetermined condition;
controlling the air-conditioning unit according to the modified setting information or control information;
comparing the number of times of performing the predetermined setting operation with the first predetermined number, wherein the first probabilistic model is built when the number of times is not less than a first predetermined number.

21. The method for controlling an air conditioner according to claim 20, wherein the air conditioner further comprising an operating unit for performing setting operation of the air conditioner and a storage unit,
the method further comprising:
storing the state information into the storage unit and relating the state information to the predetermined setting operation, each time when the predetermined setting operation is performed via the operating unit; and
building a first probabilistic model for calculating said probability of performing the predetermined setting operation using the state information which is stored in the storage unit and related to the predetermined setting operation.

22. The method for controlling an air conditioner according to claim 20, further comprising:
comparing the number of times with a second predetermined number;
deleting the state information, which is stored and related to the predetermined setting operation, from the storage unit and initializing the number of times when the number of times of performing the predetermined setting operation is the second predetermined number; and
building a second probabilistic model for calculating said probability of performing the predetermined setting operation using the state information which is stored in the storage unit and related to the predetermined setting operation each time when the predetermined setting operation is performed, when the number of times of performing the predetermined setting operation reaches the first predetermined number after the number of times reached the second predetermined number.

23. An air conditioner for a vehicle comprising:
an air-conditioning unit for supplying conditioned air into the vehicle;
an information acquiring unit for acquiring state information indicating a state of the vehicle, wherein the state information includes at least one of the pieces of locational information of the vehicle, motion information of the vehicle, time information and biological information of a passenger and also includes the air-conditioning information of the vehicle;
an operating unit for acquiring the setting information related to the setting operation of a passenger;
an air-conditioning control unit having a control equation for calculating the control information based on the air-conditioning information and the setting information, and controlling the air-conditioning unit according to the control information calculated using the control equation;
a storage unit for storing the state information acquired by the information acquiring unit each time when the predetermined setting operation is performed via the operating unit;
a learning unit for selecting the state information related to the predetermined setting operation based on the state information stored in the storage unit when the number of times of performing the setting operation is not less than a predetermines number, and modifying the control equation when the selected state information only include the air-conditioning information;
a control information modifying unit having at least one probabilistic model for calculating a probability that the passenger will perform the predetermined setting operation, and calculating said probability by inputting the state information into the at least one probabilistic model, and modifying the setting information or the control information according to said probability so that the predetermined setting operation is performed, wherein
the learning unit builds the probabilistic model related to the predetermined setting operation when the selected state information includes information which is independent of the air-conditioning information.

24. The air conditioner according to claim 23, wherein the learning unit builds temporary probabilistic models for calculating said probability by deciding a graph structure of each temporary probability model and a conditional probability relating to each node included in the graph structure using the state information which is stored in the storage unit and related to the predetermined setting operation, selects the most appropriate temporary probabilistic model from the temporary probabilistic models according to a predetermined criterion, and selects the state information which is to be inputted into the selected temporary probabilistic model as the state information related to the predetermined setting operation.

25. The air conditioner according to claim 24, wherein the predetermined criterion is an information criterion and the learning unit selects a temporary probabilistic model corresponding to the maximum value or the minimum value of the calculated information criterion with respect to each of the temporary probabilistic models.

26. The air conditioner according to claim 24, wherein the learning unit sets the selected temporary probabilistic model to the probabilistic model related to the predetermined setting operation when the selected state information includes information which is independent of the air-conditioning information.

27. The air conditioner according to claim 23, wherein the learning unit has a plurality of standard models having a predetermined graph structure, and the learning unit builds temporary probabilistic models by deciding a conditional probability relating to each node included in the predetermined graph structure using the state information which is stored in the storage unit and related to the predetermined setting operation when the number of times of performing the predetermined setting operation is not less than the predetermined number, and the learning unit selects the most appropriate temporary probabilistic model from the temporary probabilistic models according to a predetermined criterion, and selects the state information which is to be inputted into the selected temporary probabilistic model as the state information related to the predetermined setting operation.

28. The air conditioner according to claim 27, wherein the predetermined criterion is an information criterion and the learning unit selects a temporary probabilistic model corresponding to the maximum value or the minimum value of the calculated information criterion with respect to each of the temporary probabilistic models.

29. The air conditioner according to claim 27, wherein the learning unit sets the selected temporary probabilistic model to the probabilistic model related to the predetermined setting operation when the selected state information includes information which is independent of the air-conditioning information.

30. A method of controlling an air conditioner for a vehicle, the air conditioner comprising an air-conditioning unit for supplying conditioned air into a vehicle, an information acquiring unit for acquiring state information indicating a state of the vehicle, the state information including at least one of the pieces of locational information of the vehicle, motion information of the vehicle, time information and biological information of a passenger and also includes the air-conditioning information of the vehicle, an operating unit for acquiring the setting information related to the setting operation of a passenger, and an air-conditioning control unit having a control equation for calculating the control information based on the air-conditioning information and the setting information, and controlling the air-conditioning unit according to the control information calculated using the control equation, the method comprising:
storing the state information acquired by the information acquiring unit each time the predetermined setting operation is performed via the operating unit;
selecting the state information related to the predetermined setting operation based on the state information stored in the storage unit when the number of times of performing the setting operation is not less than a predetermined number;
judging whether or not the selected state information only include the air-conditioning information; and
modifying the control equation when the selected state information only include the air-conditioning information.

31. The method of controlling an air conditioner according to claim 30,
the air conditioner further comprising a control information modifying unit having at least one probabilistic model for calculating a probability that the passenger will perform the predetermined setting operation, and calculating said probability by inputting the state information into the at least one probabilistic model, and modifying the setting information or the control information according to said probability so that the predetermined setting operation is performed, and
the method further comprising:
building the probabilistic model related to the predetermined setting operation when the selected state information includes information which is independent of the air-conditioning information.

32. A controller for control a device, comprising:
an information acquiring unit for acquiring state information including the first and the second information;
an operating unit for acquiring the setting information corresponding to the setting operation of the device;
a control unit for calculating control information by inputting the first information and the setting information into a predetermined control equation and for controlling the device according to the control information;
a storage unit for storing the state information acquired by the information acquiring unit each time the predetermined setting operation is performed via the operating unit;
a learning unit for selecting the state information related to the predetermined setting operation based on the state information stored in the storage unit and modifying the predetermined control equation when the selected state information only include the first information; and
a control information modifying unit having at least one probabilistic model for calculating a probability that the predetermined setting operation will be performed, and calculating said probability by inputting the state information into the at least one probabilistic model, and modifying the setting information or the control information according to said probability so that the predetermined setting operation is performed, wherein
said learning unit building the probabilistic model related to the predetermined setting operation when the selected state information includes information which is independent of the first information.

* * * * *

UNITED STATES PATENT AND TRADEMARK OFFICE
CERTIFICATE OF CORRECTION

| | |
|---|---|
| PATENT NO. | : 7,962,441 B2 |
| APPLICATION NO. | : 11/901946 |
| DATED | : June 14, 2011 |
| INVENTOR(S) | : Yasufumi Kojima et al. |

It is certified that error appears in the above-identified patent and that said Letters Patent is hereby corrected as shown below:

Col. 35, line 57, claim 5, "a" should be -- an --

Col. 39, line 19, claim 19, "a" should be -- an --

Col. 40, line 48, claim 23, "predetermines" should be
-- predetermined --

Col. 42, line 33, claim 31, "control" should be
-- controlling --

Signed and Sealed this
First Day of November, 2011

David J. Kappos
*Director of the United States Patent and Trademark Office*